US011770806B2

(12) United States Patent
Lee et al.

(10) Patent No.: US 11,770,806 B2
(45) Date of Patent: *Sep. 26, 2023

(54) SPATIAL QUASI CO-LOCATION CONFLICT HANDLING

(71) Applicant: QUALCOMM Incorporated, San Diego, CA (US)

(72) Inventors: Heechoon Lee, San Diego, CA (US); Peter Gaal, San Diego, CA (US); Alexandros Manolakos, San Diego, CA (US); Tao Luo, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,050

(22) Filed: Oct. 31, 2019

(65) Prior Publication Data

US 2020/0154402 A1 May 14, 2020

Related U.S. Application Data

(60) Provisional application No. 62/759,990, filed on Nov. 12, 2018.

(51) Int. Cl.
*H04W 72/04* (2023.01)
*H04L 5/00* (2006.01)
*H04W 56/00* (2009.01)

(52) U.S. Cl.
CPC ........... *H04W 72/04* (2013.01); *H04L 5/0048* (2013.01); *H04W 56/001* (2013.01)

(58) Field of Classification Search
CPC .. H04W 72/04; H04W 56/001; H04L 5/0048; H04L 5/0092; H04L 5/0023;
(Continued)

(56) References Cited

U.S. PATENT DOCUMENTS

2018/0235008 A1 8/2018 Park et al.
2018/0279145 A1* 9/2018 Jung ................. H04W 24/08
(Continued)

FOREIGN PATENT DOCUMENTS

KR         20180089551 A       8/2018
WO     WO-2018202188 A1    11/2018

OTHER PUBLICATIONS

Huawei, et al., "Initial Access in NR Unlicensed", 3GPP Draft, 3GPP TSG RAN WG1 Meeting #95, R1-1812195, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051478351, 10 Pages, Retrieved from the Internet: URL:http://www.3gpp.org/ftp/tsg%5Fran/WG1%5FRL1/TSGR1%5F95/Docs/R1%2D1812195%2Ezip, [retrieved on Nov. 3, 2018], the whole document.
(Continued)

*Primary Examiner* — Yu-Wen Chang
(74) *Attorney, Agent, or Firm* — Danai Nelisile Mhembere; Holland & Hart LLP

(57) ABSTRACT

Methods, systems, and devices for wireless communications are described. A user equipment (UE) may receive a carrier aggregation (CA) configuration for communications on a set of cells. The UE may determine that signals transmitted on the set of cells may be spatially quasi co-located based on the CA configuration and a predetermined relationship rule. For example, the UE may determine that the signals are spatially co-located based on receiving multiple synchronization signal blocks (SSBs) that have a same SSB index, receiving a common SSB, assuming that an SSB and reference signals sourced by the SSB are spatially quasi co-located, receiving a signal from a particular cell of the set of cells, or receiving a common spatial QCL relationship during a configured period of time. Once the spatial QCL
(Continued)

relationship is determined, the UE may receive the signals transmitted on the set of cells based on the spatial QCL relationship.

26 Claims, 15 Drawing Sheets

(58) Field of Classification Search
CPC ..... H04L 5/0032; H04L 5/0094; H04L 5/001; H04B 7/0695; H04B 7/088
See application file for complete search history.

(56) References Cited

U.S. PATENT DOCUMENTS

| | | | |
|---|---|---|---|
| 2018/0288755 A1 | 10/2018 | Liu et al. | |
| 2019/0052337 A1* | 2/2019 | Kwon | H04W 72/085 |
| 2019/0068348 A1 | 2/2019 | Nam | |
| 2019/0150161 A1 | 5/2019 | Cheng et al. | |
| 2019/0166513 A1 | 5/2019 | Lin | |
| 2019/0174466 A1 | 6/2019 | Zhang et al. | |
| 2019/0229879 A1 | 7/2019 | Yi et al. | |
| 2019/0230545 A1* | 7/2019 | Liou | H04W 16/28 |
| 2019/0239245 A1 | 8/2019 | Davydov et al. | |
| 2019/0253308 A1 | 8/2019 | Huang et al. | |
| 2019/0349798 A1 | 11/2019 | Lin et al. | |
| 2019/0357238 A1 | 11/2019 | Zhou et al. | |
| 2019/0379431 A1* | 12/2019 | Park | H04L 27/2613 |
| 2020/0007292 A1* | 1/2020 | Huang | H04L 5/0094 |
| 2020/0022010 A1* | 1/2020 | Kim | H04W 24/02 |
| 2020/0045569 A1* | 2/2020 | Seo | H04W 72/10 |
| 2020/0052844 A1 | 2/2020 | Yu et al. | |
| 2020/0053738 A1* | 2/2020 | Harada | H04W 24/10 |
| 2020/0177265 A1* | 6/2020 | Guan | H04W 72/0453 |
| 2020/0205131 A1 | 6/2020 | Lee et al. | |
| 2020/0280409 A1* | 9/2020 | Grant | H04L 5/0023 |
| 2020/0288479 A1* | 9/2020 | Xi | H04B 7/02 |
| 2020/0305088 A1* | 9/2020 | Nory | H04W 52/242 |
| 2020/0366351 A1* | 11/2020 | Karjalainen | H04B 7/0626 |
| 2020/0374060 A1* | 11/2020 | Wang | H04B 7/024 |
| 2020/0413356 A1* | 12/2020 | Wang | H04W 72/046 |
| 2021/0037575 A1* | 2/2021 | Ohara | H04W 74/0833 |
| 2021/0058130 A1* | 2/2021 | Zhu | H04W 74/0833 |
| 2021/0111846 A1* | 4/2021 | Lee | H04L 5/0057 |
| 2021/0195457 A1* | 6/2021 | Kim | H04W 76/28 |
| 2022/0006580 A1* | 1/2022 | Cui | H04L 27/2666 |

OTHER PUBLICATIONS

International Search Report and Written Opinion—PCT/US2019/059531—ISAEPO—dated Apr. 29, 2020.

* cited by examiner

SPATIAL QUASI CO-LOCATION CONFLICT HANDLING

CROSS REFERENCE

The present application for patent claims the benefit of U.S. Provisional Patent Application No. 62/759,990 by LEE et al., entitled "SPATIAL QUASI CO-LOCATION CONFLICT HANDLING," filed Nov. 12, 2018, assigned to the assignee hereof, and expressly incorporated by reference herein.

BACKGROUND

The following relates generally to wireless communications, and more specifically to spatial quasi co-location (QCL) conflict handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., NR), a base station may communicate with a UE using multiple antennas, where the use of multiple antennas is based on the use of one or more antenna ports. Some antenna ports may be referred to as quasi co-located, meaning that the parameters of a transmission (e.g., Doppler shirt, Doppler spread, average delay, delay spread, spatial reception parameter, etc.) on one antenna port may be inferred from the parameters of another transmission on a different antenna port. Accordingly, a receiving device (e.g., a UE) may be able to perform channel estimation for demodulating data or control information received on a first set of antenna ports based on reference signals received on a second set of antenna ports that are quasi co-located with the first set of antenna ports. Thus, a QCL relationship between antenna ports may improve the chances that a UE may be able to successfully decode a downlink transmission from a base station. However, in some cases, the UE may not support multiple spatial QCL relationships simultaneously (e.g., for different carriers or cells). Efficient techniques are desired for supporting different spatial QCL relationships across the multiple antennas.

SUMMARY

The described techniques relate to improved methods, systems, devices, and apparatuses that support spatial quasi co-location (QCL) conflict handling. Generally, the described techniques provide for a user equipment (UE) receiving, from a base station, a carrier aggregation (CA) configuration for communications on a set of cells (e.g., from one or more base stations). In some cases, the UE may determine that signals transmitted on the set of cells may be spatially quasi co-located based on the CA configuration and a predetermined relationship rule. For example, the UE may determine that the signals are spatially co-located based on receiving multiple synchronization signal blocks (SSBs) that each have a same SSB index. Additionally or alternatively, the UE may determine that the signals are spatially quasi co-located based on receiving a cross-carrier indication that indicates a same SSB is received across the set of cells. In some cases, the UE may determine that the signals are spatially quasi co-located based on an assumption that an SSB and reference signals sourced by the SSB are spatially quasi co-located. Additionally or alternatively, the UE may determine that the signals are spatially co-located based on receiving a signal from a particular cell (e.g., a primary cell (PCell), a primary secondary cell (PSCell), or a cell with a smallest serving index within an intra-band CA) of the set of cells. In some cases, the UE may determine that the signals are spatially co-located based on receiving the signals during a period of time where the signals are spatially co-located according to a common spatial QCL relationship and selecting a signal during that period of time. Once the spatial QCL relationship is determined, the UE may receive the signals transmitted on the set of cells based on the spatial QCL relationship.

A method of wireless communications at a UE is described. The method may include receiving a configuration for CA communications on a set of cells, determining, from the configuration and based on a predetermined relationship rule, that signals transmitted on the set of cells are spatially quasi co-located, and receiving the signals transmitted on the set of cells based on the determination that the signals are spatially quasi co-located.

An apparatus for wireless communications at a UE is described. The apparatus may include a processor, memory in electronic communication with the processor, and instructions stored in the memory. The instructions may be executable by the processor to cause the apparatus to receive a configuration for CA communications on a set of cells, determine, from the configuration and based on a predetermined relationship rule, that signals transmitted on the set of cells are spatially quasi co-located, and receive the signals transmitted on the set of cells based on the determination that the signals are spatially quasi co-located.

Another apparatus for wireless communications at a UE is described. The apparatus may include means for receiving a configuration for CA communications on a set of cells, determining, from the configuration and based on a predetermined relationship rule, that signals transmitted on the set of cells are spatially quasi co-located, and receiving the signals transmitted on the set of cells based on the determination that the signals are spatially quasi co-located.

A non-transitory computer-readable medium storing code for wireless communications at a UE is described. The code may include instructions executable by a processor to receive a configuration for CA communications on a set of cells, determine, from the configuration and based on a predetermined relationship rule, that signals transmitted on the set of cells are spatially quasi co-located, and receive the signals transmitted on the set of cells based on the determination that the signals are spatially quasi co-located.

In some examples of the method, apparatuses, and non-transitory computer-readable medium described herein, determining that the signals may be spatially quasi co-located may include operations, features, means, or instructions for receiving multiple SSBs from the set of cells, and identifying that the multiple SSBs each may have a same SSB index, where the predetermined relationship rule may be that signals across the set of cells may be spatially quasi co-located based on the signals having the same SSB index.

In some examples of the method, apparatuses, and non-transitory computer-readable medium described herein, determining that the signals may be spatially quasi co-located may include operations, features, means, or instructions for receiving a cross-carrier indication that indicates a common SSB, where the predetermined relationship rule may be that signals across the set of cells may be spatially quasi co-located based on the common SSB.

In some examples of the method, apparatuses, and non-transitory computer-readable medium described herein, determining that the signals may be spatially quasi co-located may include operations, features, means, or instructions for receiving a SSB and a reference signal sourced by the SSB, where the predetermined relationship rule may be that SSBs and reference signals sourced by the SSBs may be spatially quasi co-located.

In some examples of the method, apparatuses, and non-transitory computer-readable medium described herein, the SSB may be common across the set of cells.

In some examples of the method, apparatuses, and non-transitory computer-readable medium described herein, determining that the signals may be spatially quasi co-located may include operations, features, means, or instructions for receiving at least one of the signals on a particular cell of the set of cells, where the predetermined relationship rule may be that the signals may be spatially quasi co-located with the at least one of the signals based on a characteristic of the particular cell.

In some examples of the method, apparatuses, and non-transitory computer-readable medium described herein, the characteristic of the particular cell may be that the particular cell may be a PCell, a PSCell, or a cell with a smallest serving index within an intra-band CA.

In some examples of the method, apparatuses, and non-transitory computer-readable medium described herein, determining that the signals may be spatially quasi co-located may include operations, features, means, or instructions for receiving the signals during a period of time during which the signals may be actually spatially quasi co-located, and selecting a signal during the period of time, where the predetermined relationship rule may be that the signals may be spatially quasi co-located with the selected signal.

In some examples of the method, apparatuses, and non-transitory computer-readable medium described herein, receiving the signals transmitted on the set of cells based on the determination that the signals may be spatially quasi co-located may include operations, features, means, or instructions for monitoring for one or more SSBs from a first cell of the set of cells based on the predetermined relationship rule, receiving at least one SSB based on monitoring for the one or more SSBs, and receiving one or more reference signals from at least one cell of the set of cells based on the predetermined relationship rule and monitoring for the SSBs.

In some examples of the method, apparatuses, and non-transitory computer-readable medium described herein, the reference signals include channel state information reference signals (CSI-RSs), a tracking reference signals (TRSs), or a combination thereof.

In some examples of the method, apparatuses, and non-transitory computer-readable medium described herein, determining that the signals may be spatially quasi co-located may include operations, features, means, or instructions for receiving a SSB and a reference signal sourced by the SSB, where the predetermined relationship rule may be that SSBs and reference signals sourced by the SSBs may be spatially quasi co-located even when the SSB and reference signals sourced by the SSB may be not actually quasi co-located.

In some examples of the method, apparatuses, and non-transitory computer-readable medium described herein, the CA configuration may be an intra-band CA configuration.

A method of wireless communications at a base station is described. The method may include transmitting, to a UE, a CA configuration for communications on a set of cells and transmitting signals to the UE in accordance with a predetermined relationship rule such that the UE can receive the signals as if the signals are spatially quasi co-located.

An apparatus for wireless communications at a base station is described. The apparatus may include a processor, memory in electronic communication with the processor, and instructions stored in the memory. The instructions may be executable by the processor to cause the apparatus to transmit, to a UE, a CA configuration for communications on a set of cells and transmit signals to the UE in accordance with a predetermined relationship rule such that the UE can receive the signals as if the signals are spatially quasi co-located.

Another apparatus for wireless communications at a base station is described. The apparatus may include means for transmitting, to a UE, a CA configuration for communications on a set of cells and transmitting signals to the UE in accordance with a predetermined relationship rule such that the UE can receive the signals as if the signals are spatially quasi co-located.

A non-transitory computer-readable medium storing code for wireless communications at a base station is described. The code may include instructions executable by a processor to transmit, to a UE, a CA configuration for communications on a set of cells and transmit signals to the UE in accordance with a predetermined relationship rule such that the UE can receive the signals as if the signals are spatially quasi co-located.

In some examples of the method, apparatuses, and non-transitory computer-readable medium described herein, transmitting the signals may include operations, features, means, or instructions for transmitting one or more SSBs having a first spatial quasi co-location, and transmitting one or more reference signals sourced by the one or more SSBs having a second spatial quasi co-location.

In some examples of the method, apparatuses, and non-transitory computer-readable medium described herein, the one or more SSBs and the one or more reference signals sourced by the one or more SSBs may be not spatially quasi co-located.

In some examples of the method, apparatuses, and non-transitory computer-readable medium described herein, the one or more SSBs and the one or more reference signals sourced by the one or more SSBs may be spatially quasi co-located.

In some examples of the method, apparatuses, and non-transitory computer-readable medium described herein, the CA configuration for communications on a set of cells includes an intra-band CA configuration.

Some examples of the method, apparatuses, and non-transitory computer-readable medium described herein may further include operations, features, means, or instructions for transmitting a cross-carrier indication that the signals may be spatially quasi co-located via a common SSB based on the intra-band CA configuration.

Some examples of the method, apparatuses, and non-transitory computer-readable medium described herein may further include operations, features, means, or instructions for configuring the signals across cells within the CA such that the signals may be spatially quasi co-located with a common SSB.

Some examples of the method, apparatuses, and non-transitory computer-readable medium described herein may further include operations, features, means, or instructions for transmitting the signals during a period of time during which the signals may be actually spatially quasi co-located for a period of time.

DETAILED DESCRIPTION

Figure 1:
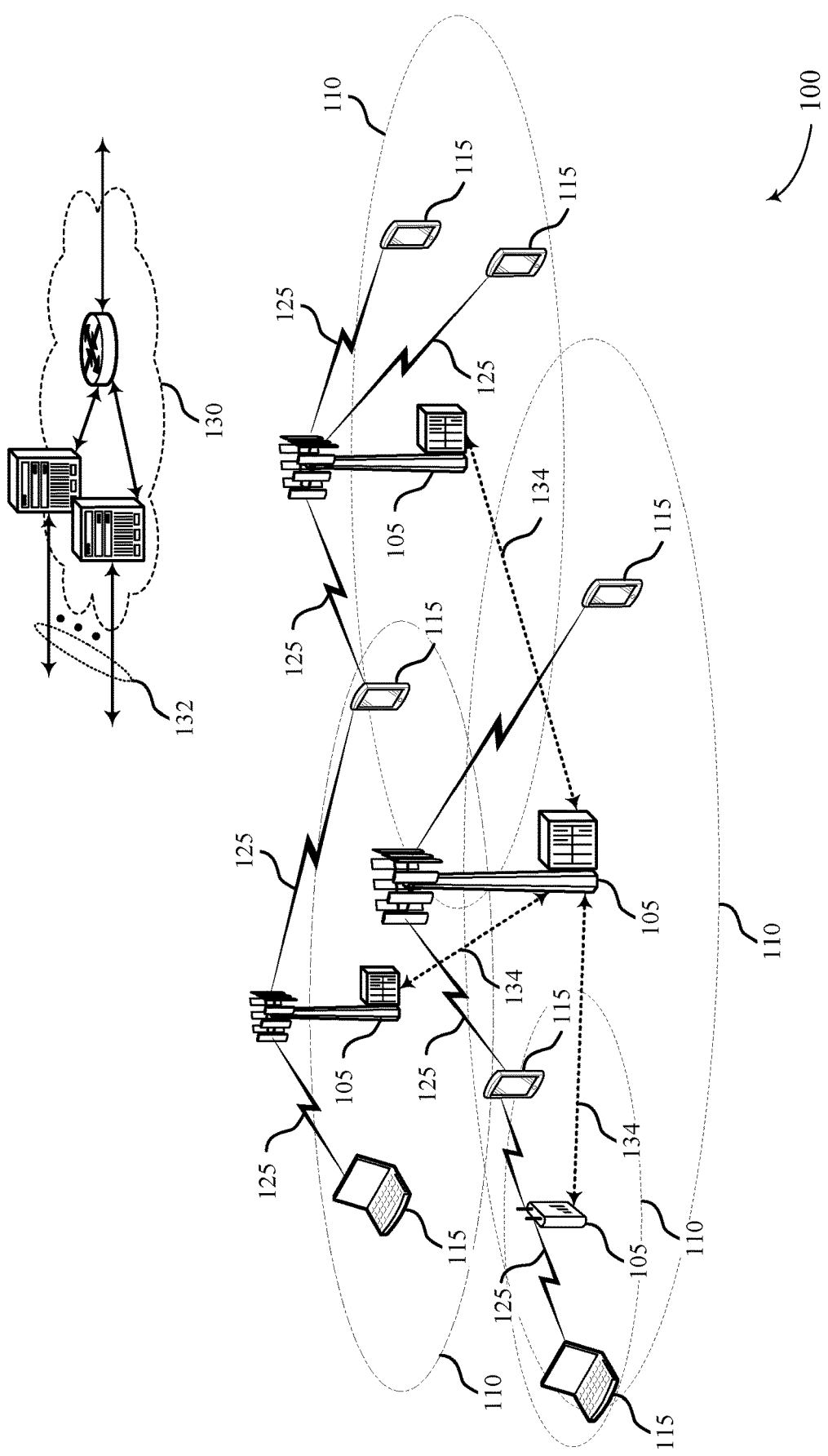
FIG. 1 illustrates an example of a system for wireless communications that supports spatial quasi co-location (QCL) conflict handling in accordance with aspects of the present disclosure.

In some wireless communications systems, a base station may communicate with a user equipment (UE) using multiple antennas. Additionally, the base station may include multiple cells and communicate with the UE according to a carrier aggregation (CA) configuration that uses the multiple antennas for communications on the multiple cells. In some cases, the CA configuration may include communications on multiple cells from multiple antennas on one or more separate base stations. Based on using the multiple antennas, a quasi co-location (QCL) relationship may exist between one or more antenna ports that correspond to the multiple antennas. The QCL relationship may indicate that spatial parameters of a transmission on one antenna port can be inferred from the spatial parameters of another transmission on a different antenna port.

However, the UE may not support multiple spatial QCL relationships simultaneously within a cell or across cells for an intra-band CA configuration. For example, spatial QCL may be tied to different antenna port (e.g., antenna panels, antennas, etc.) selections or adjustments, such that supporting multiple spatial QCL relationships would require additional hardware costs at the UE. Additionally, the UE may assume different spatial QCL relationships for a first and a second signal even if a QCL of the second signal is sourced by the first signal. For example, a synchronization signal block (SSB) transmission may be a source QCL for a reference signal transmission (e.g., channel state information reference signal (CSI-RS), tracking reference signal (TRS), etc.), indicating that the two transmissions are quasi co-located, but the UE may still assume that the two transmissions have different QCL relationships based on the UE not supporting multiple spatial QCL relationships simultaneously.

To overcome the limitation of supporting one spatial QCL relationship for a CA configuration, the UE may apply a single spatial QCL relationship across the multiple cells of the CA configuration based on a predetermined relationship rule. For example, the UE may assume a same spatial QCL relationship across cells in the CA configuration that transmit SSBs with a same SSB index. Additionally or alternatively, the UE may assume a same spatial QCL relationship across cells in the CA configuration that transmit a same SSB with a cross-carrier QCL indication. In some cases, the UE may determine a same spatial QCL relationship based on an assumption that an SSB and reference signals sourced by the SSB are spatially quasi co-located. Additionally or alternatively, the UE may determine a same spatial QCL relationship based on receiving a signal from a particular cell (e.g., a primary cell (PCell), a primary secondary cell (PSCell), or a cell with a smallest serving index within an intra-band CA) of the multiple cells. In some cases, the UE may determine a same spatial QCL relationship based on receiving signals during a period of time where the signals are spatially co-located according to a common spatial QCL relationship and selecting a signal during that period of time to determine the spatial QCL relationship to use. Once the spatial QCL relationship is determined, the UE may receive the signals transmitted on the set of cells based on the spatial QCL relationship.

Particular aspects of the subject matter described herein may be implemented to realize one or more advantages. The described techniques may support improvements in communications using multiple component carriers for communication at a UE, which may improve reliability and throughput, as well as mitigating the effects of time delays between communications over different component carriers, among other advantages. As such, supported techniques may include improved network operations and, in some examples, may promote network efficiencies, among other benefits.

Aspects of the disclosure are initially described in the context of a wireless communications system. An additional wireless communications system and a process flow are provided to illustrate aspects of the disclosure. Aspects of the disclosure are further illustrated by and described with reference to apparatus diagrams, system diagrams, and flowcharts that relate to spatial QCL conflict handling.

FIG. 1 illustrates an example of a wireless communications system 100 that supports spatial QCL conflict handling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may additionally or alternatively use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI).

In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may additionally or alternatively include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predetermined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, in wireless communications system 100, data streams transmitted from a base station 105 may be mapped to antennas using antenna ports. An antenna port may be a logical entity used to map data streams to antennas. A given antenna port may drive transmissions from one or more antennas and resolve signal components received over one or more antennas. Each antenna port may be associated with an RS, which may allow the receiver to perform channel estimation on data streams associated with the different antenna ports in a received transmission. In some cases, groups of antenna ports may be referred to as being quasi co-located (e.g., the groups of antenna ports have the same QCL qualities, assumptions, or are of the same type).

In some instances, base stations 105 may indicate QCL types to UEs 115 based on a higher layer parameter, QCL-Type. Additionally, base stations 105 may indicate to UEs 115 the groups of antenna ports that are quasi co-located and a QCL-Type associated with the configuration. QCL-Type may take one or a combination of the following types shown in Table 1.1, which details the qualities or assumptions that are shared among transmissions of the same QCL type.

TABLE 1.1

| QCL-TypeA | {Doppler shift, Doppler spread, average delay, delay spread} |
| QCL-TypeB | {Doppler shift, Doppler spread} |
| QCL-TypeC | {average delay, Doppler shift} |
| QCL-TypeD | {Spatial Receive (Rx) Parameter} |

In some cases, QCL-TypeD may be referred to as a spatial QCL based on addressing spatial QCL parameters for the different antenna ports (e.g., for a frequency range 2 (FR2) and/or mmW communications). For example, if a base station 105 indicates that two sets of antenna ports are using the same QCL-TypeD (e.g., spatial QCL), a UE 115 may be able to determine spatial receive parameters associated with a transmission on one set of antenna ports based on signals received on another set of antenna ports. In some cases, different antenna ports may be selected and/or adjusted for subsequent transmissions based on a source transmission when both transmissions have the spatial QCL. Additionally, QCL information may be associated with a particular reference signal such as an SSB, a demodulation reference signal (DMRS), CSI-RS, TRS, etc. In some cases, a UE 115 may receive an indication that a physical downlink control channel (PDCCH) with DMRS is quasi co-located with a CSI-RS with respect to one or more parameters (e.g., QCL type D). As such, the UE 115-a may estimate one or more parameters for the antenna port, signal, and/or channel. The UE 115-a may then apply the estimates of the PDCCH for channel estimation of the downlink channel corresponding to another antenna port quasi co-located with the antenna port. Hence, the UE 115-a may utilize QCL information associated with antenna ports, reference signals, and other signals for channel estimations and demodulating data (e.g., tuning an antenna or antenna port to a particular direction).

In some cases, a UE 115 may not support multiple spatial QCL types simultaneously due to cost reasons or the complexity of implementation within a cell or across cells with CA (e.g., intra-band CA). However, in some instances, the network may not be able to avoid configuring different spatial QCL types simultaneously, due to the different functionalities the network supports (e.g., PDCCH monitoring, physical downlink shared channel (PDSCH) reception, SSB monitoring, CSI-RS monitoring, tracking, etc.). Additionally, a wireless communications system may be unable to inform a UE 115 that the same spatial QCL type exists across cells. In some cases, a UE 115 may even assume a reference signal (e.g., CSI-RS) is different in spatial QCL than its source SSB (e.g., since a reference signal beam may be finer than an SSB beam). The lack of a means to indicate a shared spatial QCL type across multiple cells may present problems for CA, where a reference signal in one cell can be sourced from an SSB in another cell and may, thus, share spatial QCL properties. Accordingly, a UE may not be able to assume a single spatial QCL across cells and, thus, may be unable to process multiple cells simultaneously in CA communications (e.g., intra-band CA).

For single cell operation or in operation with CA in a same frequency band, a UE 115 may monitor multiple search spaces associated with different control resource sets (CORESETS). In some cases, if the search space monitoring occasions overlap in time and the search spaces are associated with different CORESETs having different spatial QCL properties, the UE 115 may monitor search spaces associated with a given CORESET containing a common search space (CSS) in the active downlink bandwidth part (DL BWP). Additionally, this CORESET may be in the serving cell with the lowest serving cell index. In some cases, in addition to monitoring the selected CORESET, the UE 115 may monitor any other CORESET associated with the same spatial QCL properties as the given CORESET. In some examples, non-selected search spaces may be considered dropped.

Additionally, if two or more CORESETS contain a CSS, the UE may select the CORESET containing the search space having the lowest identification (ID) in the monitoring occasions in the active DL BWP, in the serving cell with the lowest serving cell index. In some cases, none of the CORESETs may contains a CSS, in which case the UE may select the CORESET containing the search space having the lowest ID in the monitoring occasions in the active DL BWP, in the serving cell with the lowest serving cell index. In both cases, in addition to monitoring the selected CORESET, the UE 115 may monitor any other CORESET associated with the same spatial QCL properties as the given CORESET and non-selected search spaces may be considered dropped.

In the case of selecting a CORESET to monitor, blind decoding and control channel element counting may be based on the search space before resource dropping due to spatial QCL conflicts. Similarly, the number of actively-configured transmission configuration indicator (TCI) states of a CORESET may be upper bounded by the UE's capability, without considering resource dropping due to spatial QCL conflicts. The outcome of the process described herein may be that a UE 115 drops all other cells once it identifies a CORESET to monitor. As previously stated, this may cause problems for a UE 115 participating in CA communications, in which multiple cells may be simultaneously transmitting to the UE 115. For example, spatial QCL may be tied to different antenna port (e.g., antenna panels, antennas, etc.) selections or adjustments, such that supporting multiple spatial QCL relationships would require additional hardware costs at the UE 115.

Wireless communications system 100 may support efficient techniques for a UE 115 to apply a singular spatial QCL relationship across the multiple cells of the CA configuration based on a predetermined relationship rule. For example, the UE 115 may assume a same spatial QCL relationship across cells in the CA configuration that transmit SSBs with a same SSB index. Additionally or alternatively, the UE 115 may assume a same spatial QCL relationship across cells in the CA configuration that transmit a same SSB, based on a cross-carrier QCL indication. In some cases, the UE 115 may determine a same spatial QCL relationship based on an assumption that an SSB and reference signals sourced by the SSB are spatially quasi co-located. Additionally or alternatively, the UE 115 may determine a same spatial QCL relationship based on receiving a signal from a particular cell (e.g., a PCell, a PSCell, or a cell with a smallest serving index within an intra-band CA) of the multiple cells. In some cases, the UE 115 may determine a same spatial QCL relationship based on receiving signals during a period of time where the signals are spatially co-located according to a common spatial QCL relationship and selecting a signal during that period of time to determine the spatial QCL relationship to use. Once the spatial QCL relationship is determined, the UE 115 may simultaneously receive the signals transmitted on the set of cells based on the spatial QCL relationship.

Figure 2:
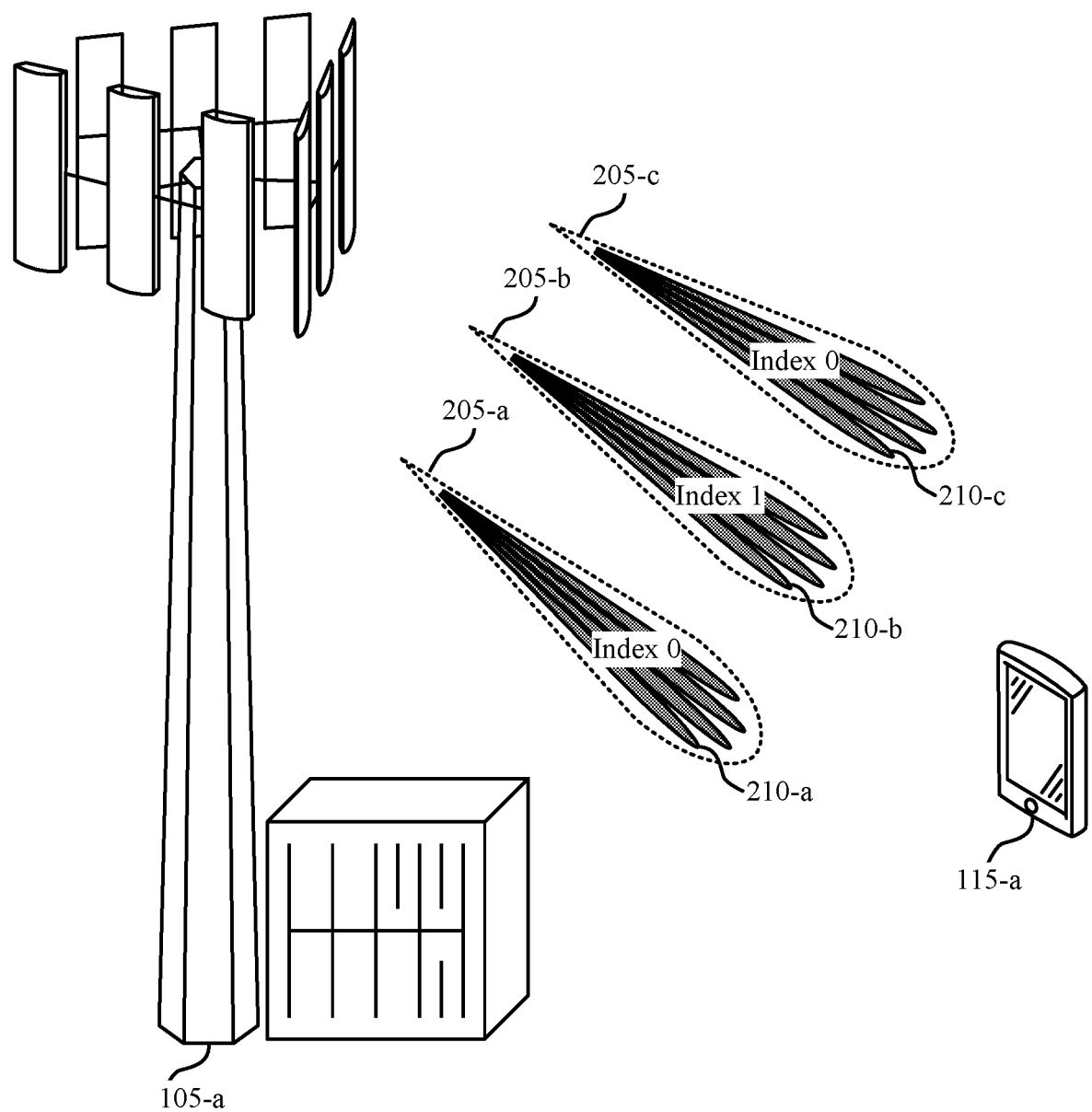
FIG. 2 illustrates an example of a wireless communications system that supports spatial QCL conflict handling in accordance with aspects of the present disclosure.

FIG. 2 illustrates an example of a wireless communications system 200 that supports spatial QCL conflict handling in accordance with aspects of the present disclosure. In some examples, wireless communications system 200 may implement aspects of wireless communications system 100. Wireless communications system 200 may include a base station 105-*a* and a UE 115-*a*, which may be examples of the corresponding devices described with reference to FIG. 1. In some cases, UE 115-*a* and base station 105-*a* may communicate one or more SSBs 205 and one or more reference signals 210 (e.g., CSI-RSs, TRSs) and, accordingly, may operate in a mmW spectrum and/or using NR technologies. In some cases, UE 115-*a* and base station 105-*a* may also communicate using beamforming techniques (e.g., SSBs 205 and reference signals 210 are transmitted on corresponding beams) and/or may utilize MIMO operations. Additionally, UE 115-*a* and base station 105-*a* may be part of CA communications, which may include multiple cells transmitting to UE 115-*a*. The multiple cells included in the CA communications may be located at one or more base stations 105, or may be located at one base station 105-*a*.

In some cases, wireless communications system 200 may implement a predetermined relationship rule to inform a receiving device that certain types of transmissions in CA communications are spatially quasi co-located. In one example, of a predetermined relationship rule, a communications system 200 may introduce relaxation of spatial QCL (e.g., QCL type D) for cells within intra-band CA. In this case, the network may configure a receiving device using intra-band CA (e.g., UE 115-*a*) to assume that transmissions from cells transmitting in the intra-band CA are spatially quasi co-located as long as the cells have the same SSB index, irrespective of the cell. Additionally, this relationship rule may allow the UE 115-*a* to assume that some or all reference signals across different cells in the intra-band CA have a same spatial QCL type. This rule may allow the receiving device to monitor and receive reference signals that it may have otherwise dropped as a result of assuming they were not spatially quasi co-located. In this scheme, the network may or may not assign a different QCL type for the SSBs and TRSs within a given cell.

For example, two or more cells may transmit SSBs 205 and reference signals 210, where at least two of the cells are part of the intra-band CA and are spatially quasi co-located. The two or more cells may belong to the same base station (e.g., base station 105-*a*). Additionally or alternatively, the two or more cells may belong to separate base stations. In one example, base station 105-*a* may transmit SSBs 205-*a*, 205-*b*, and 205-*c* from separate cells. Additionally, base station 105-*a* may transmit reference signal group 210-*a* (e.g., which may depend from SSB 205-*a*), reference signal group 210-*b* (e.g., which may depend from SSB 205-*b*), and reference signal group 210-*c* (e.g., which may depend from SSB 205-*c*) from separate cells. In some examples, SSBs 205-*a*, 205-*b*, and 205-*c*, as well their dependent reference signal groups 210-*a*, 210-*b*, and 210-*c*, may be sent using different frequency resources, which may also overlap in the time domain. In some cases, reference signals 210-*a* and 210-*c* may have similar spatial qualities, may be spatially quasi co-located, and may be part of intra-band CA transmissions.

In this example, base station 105-*a* and UE 115-*a* may be in communication with each other as part of intra-band CA. Additionally, the network may have configured UE 115-*a* to know that wireless communications system 200 is operating using intra-band CA with relaxation of spatial QCL. In this case, UE 115-*a* may therefore determine that all the reference signals 210 (e.g., TRSs, CSI-RSs) within the intra-band CA are spatially quasi co-located, as long as they have the same SSB index. As such, UE 115-*a* may ascertain that reference signal groups 210-*a* and 210-*c* depend from SSBs 205-*a* and 205-*c*, respectively, which have the same SSB index. Since these reference signal groups depend from SSBs with the same SSB index, UE 115-*a* may assume that reference signal groups 210-*a* and 210-*c* are spatially quasi co-located. Therefore, UE 115-*a* may determine to monitor SSBs 205-*a* and 205-*c* and reference signals 210-*a* and 210-*c*, and simultaneously receive reference signals 210-*a* and 210-*c*. In some cases, the network may configure SSBs 205 to have a different QCL type from reference signals 210. In other cases, the network may configure SSBs 205 to have the same QCL type as reference signals 210.

In another example, of a predetermined relationship rule, a communications system 200 may send a cross-carrier indication to indicate a relaxed spatial QCL (e.g., QCL type D) for cells within intra-band CA. In this case, the network may configure a receiving device (e.g., using a cross-carrier indication) using intra-band CA to assume that transmissions from cells transmitting in the intra-band CA are spatially quasi co-located, as long as the cells have the same SSB (e.g., the SSBs occupy the same time-frequency resources). In this case, the network may use TCI information to define the QCL and its association with its source (e.g., a source or parent SSB). In some cases, this relationship rule may allow the receiving device to assume that some or all reference signals across different cells in the intra-band CA are spatially quasi co-located. This rule may allow the receiving device to monitor and receive reference signals that it may have otherwise dropped as a result of assuming they were not spatially quasi co-located. In this scheme, the network may or may not use a different QCL type for the SSBs and TRSs within the intra-band CA. Additionally or alternatively, since this relationship rule is based on cross-carrier indication, which is used in multiple types of CA (e.g., inter-band CA and intra-band CA), the network is not limited to implementing the scheme for intra-band CA alone, and may expand it and use it for other forms of CA.

In one example, of using cross-carrier indication, two or more cells may transmit SSBs 205 and reference signals 210, where one or more of the signals are spatially quasi co-located. The two or more cells may belong to the same base station, as in the example of base station 105-a. Additionally or alternatively, the two or more cells may belong to separate base stations. In one example, base station 105-a may transmit SSBs 205-a, 205-b, and 205-c from separate cells. Additionally, base station 105-a may transmit reference signal group 210-a (e.g., which may depend from SSB 205-a), reference signal group 210-b (e.g., which may depend from SSB 205-b), and reference signal group 210-c (e.g., which may depend from SSB 205-c) from separate cells. In some examples, SSBs 205-a, 205-b, and 205-c, as well their dependent reference signal groups 210-a, 210-b, and 210-c, may be sent using different frequency resources, which may also overlap in the time domain. In some cases, reference signals 210-a and 210-b may have similar spatial qualities, may be spatially quasi co-located, and may be transmitted using the same SSB (e.g., using the same resources) within intra-band CA transmissions.

In this example, base station 105-a and UE 115-a may be in communication with each other using intra-band CA. Additionally, the network may have configured UE 115-a to know that wireless communications system 200 is operating using intra-band CA, and indicate relaxation of spatial QCL via cross-carrier indication. In this case, UE 115-a may therefore assume that all the reference signals 210 (e.g., TRSs, CSI-RSs) within the intra-band CA are spatially quasi co-located, as long as they have the same SSB 205. As such, UE 115-a may receive SSBs 205-a and 205-b and determine that they belong to the same SSB 205 (e.g., were transmitted using the same resources). Following this determination, UE 115-a may further determine that reference signal groups 210-a and 210-b are spatially quasi co-located, since they were sourced by the same SSB (e.g., same parent or source SSB 205-a, 205-b). Therefore, UE 115-a may determine to monitor SSBs 205-a and 205-b and reference signals 210-a and 210-b, and simultaneously receive reference signals 210-a and 210-b. In some cases, the network may configure SSBs 205 to have a different QCL type than reference signals 210. In other cases, the network may configure SSBs 205 to have the same QCL type as reference signals 210.

In either of the above-mentioned predetermined relationship rules for cells within intra-band CA, UE 115-a may determine or assume that the parent (e.g., source) SSBs 205 and the reference signals 210 sourced by the SSBs 205 within the intra-band CA are spatially quasi co-located. As such, UE 115-a may monitor the SSBs 205 and reference signals 210 and receive them at the same time, as long as the network indicates that the multiple RSs are the same QCL type (e.g., using one of the schemes above to indicate QCL types via SSB or SSB index). In some cases, the network may configure a QCL type across the multiple cells within the intra-band CA from a common SSB, which may allow the SSBs 205 and reference signals 210 within the intra-band CA to be spatially quasi co-located. Additionally or alternatively, the network may indicate that the SSBs 205 and reference signals 210 within the intra-band CA have the same QCL type via cross-carrier indication. In some cases, the relationship rule may indicate that SSBs 205 and reference signals 210 sourced by the SSBs 205 are spatially quasi co-located even when the SSBs 205 and reference signals 210 sourced by the SSBs 205 are not actually spatially quasi co-located.

In an additional example of a predetermined relationship rule, a receiving device (e.g., UE 115-a) may assumed all intra-band CA transmissions are spatially quasi co-located based on a characteristic of an indicated cell that transmits a message to the receiving device. For example, the network may configure a device to determine a QCL type to assume based on whether the indicated cell is a PCell or whether the cell is a PSCell. Additionally or alternatively, the network may configure a device to assume a QCL type based on the smallest serving cell index within the intra-band CA.

In some examples of a predetermined relationship rule, a receiving device (e.g., UE 115-a) may determine or decide that all intra-band CA transmissions are spatially quasi co-located. In this case, the network may ensure a common spatial QCL for the intra-band CA transmissions in a given time, such that the receiving device may choose any cell from within the intra-band CA to determine QCL type.

Figure 3:
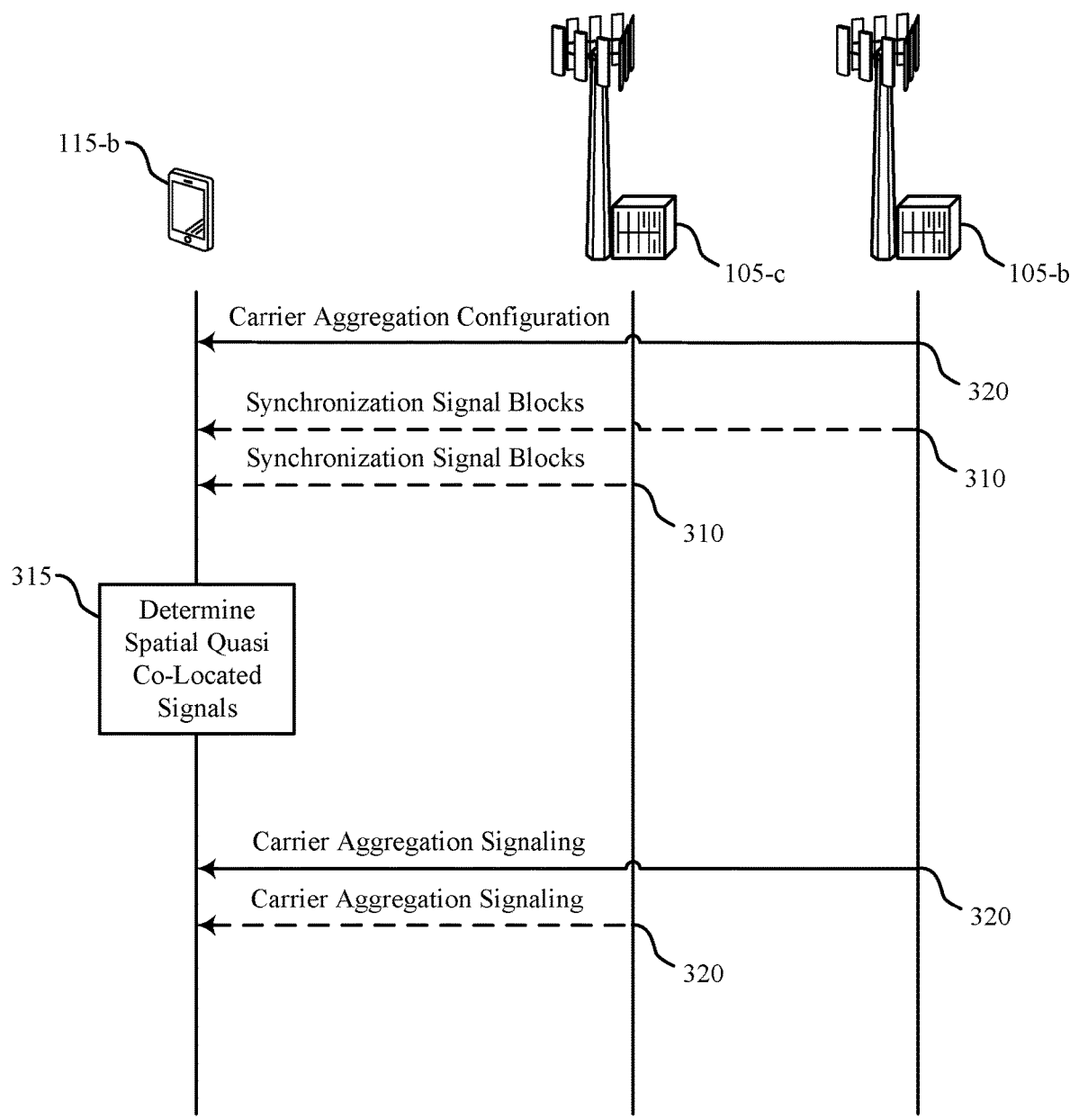
FIG. 3 illustrates an example of a process flow that supports spatial QCL conflict handling in accordance with aspects of the present disclosure.

FIG. 3 illustrates an example of a process flow 300 that supports spatial QCL conflict handling in accordance with aspects of the present disclosure. In some examples, process flow 300 may implement aspects of wireless communications systems 100 and/or 200. Process flow 300 may include a first transmitting device (e.g., base station 105-b), a second transmitting device (e.g., base station 105-c), and a receiving device (e.g., UE 115-b), which may be examples of base stations 105 and a UE 115 as described herein with reference to FIGS. 1-2.

In the following description of process flow 300, the operations between the base stations 105-b and 105-c and UE 115-b may be transmitted in a different order than the exemplary order shown, or the operations performed by base stations 105-b and 105-c and UE 115-b may be performed in different orders or at different times. Certain operations may also be left out of the process flow 300, or other operations may be added to the process flow 300. It is to be understood that while base stations 105-b and 105-c and UE 115-b are shown performing a number of the operations of process flow 300, any wireless device may perform the operations shown.

At 305, base station 105-b may transmit, and UE 115-b may receive, a CA configuration for CA communications on multiple cells. In some instances, the CA configuration may be an intra-band CA configuration. Additionally or alternatively, transmitting the CA configuration may include transmitting a cross-carrier indication that signals transmitted on the multiple cells are spatially quasi co-located via a common SSB based on the intra-band CA configuration.

At 310, UE 115-b may receive, in some cases, one or more SSBs from multiple cells, where the multiple cells may include cells located at base stations 105-b and 105-c. Additionally or alternatively, the multiple cells may include cells located at one base station 105-b.

At 315, UE 115-b may determine, from the configuration and based on a predetermined relationship rule, that signals transmitted on the multiple cells (e.g., base stations 105-b and 105-c, just base station 105-b) are spatially quasi co-located. In some instances, determining that the signals are spatially quasi co-located may include identifying that the multiple SSBs each have a same SSB index, where the predetermined relationship rule is that signals across the multiple cells are spatially quasi co-located based on the signals having the same SSB index. In other instances, determining that the signals are spatially quasi co-located may include receiving a cross-carrier indication that indicates a common SSB, where the predetermined relationship rule is that signals across the multiple cells are spatially quasi co-located based on the common SSBs.

Additionally or alternatively, determining that the signals are spatially quasi co-located may include receiving an SSB and a reference signal sourced by the SSB, where the predetermined relationship rule is that SSBs and reference signals sourced by the SSBs are spatially quasi co-located. In some cases, the SSB may be common across the multiple cells. In some examples, determining that the signals are spatially quasi co-located may include receiving at least one of the signals on a particular cell of the multiple cells, where the predetermined relationship rule is that the signals are spatially quasi co-located with the at least one of the signals based on a characteristic of the particular cell. In some cases, the characteristic of the particular cell may be that the particular cell is a PCell, a PSCell, or a cell with a smallest serving index within an intra-band CA.

In some cases, determining that the signals are spatially quasi co-located may include receiving the signals during a period of time during which the signals are actually spatially quasi co-located and selecting a signal during the period of time, where the predetermined relationship rule is that the signals are spatially quasi co-located with the selected signal. Additionally or alternatively, determining that the signals are spatially quasi co-located may include receiving an SSB and an reference signal sourced by the SSB, where the predetermined relationship rule is that SSBs and reference signals sourced by the SSBs are spatially quasi co-located even when the SSB and reference signals sourced by the SSB are not actually quasi co-located.

At 320, UE 115-*b* may receive the signals transmitted on the multiple cells based on the determination that the signals are spatially quasi co-located, where the multiple cells may include cells at base stations 105-*b* and 105-*c*. Additionally or alternatively, the multiple cells may include cells located at one base station 105-*b*. In some cases, receiving the signals transmitted on the multiple cells may include monitoring for one or more SSBs from a first cell of the multiple cells based on the predetermined relationship rule, receiving at least one SSB based on monitoring for the one or more SSBs, and receiving one or more reference signals from at least one cell of the multiple cells based on the predetermined relationship rule and monitoring for the SSBs. In some instances, the reference signals may include CSI-RSs, TRSs, or a combination thereof.

At 320, base station 105-*b*, and any other base station that may contain cells transmitting to UE 115-*b* (e.g., base station 105-*c*), may transmit signals to UE 115-*b* in accordance with the predetermined relationship rule such that UE 115-*b* can receive the signals as if the signals are spatially quasi co-located. In some cases, transmitting the signals may include transmitting one or more SSBs having a first spatial QCL and transmitting one or more reference signals sourced by the one or more SSBs having a second spatial QCL. In some instances, the one or more SSBs and the one or more reference signals sourced by the one or more SSBs may not be spatially quasi co-located. In other instances, the one or more SSBs and the one or more reference signals sourced by the one or more SSBs may be spatially quasi co-located. Additionally or alternatively, the signals may be configured across cells within the CA such that the signals are spatially quasi co-located with a common SSB. In some cases, base station 105-*b* (and possibly base station 105-*c*) may transmit the signals during a period of time during which the signals are actually spatially quasi co-located for a period of time.

Figure 4:
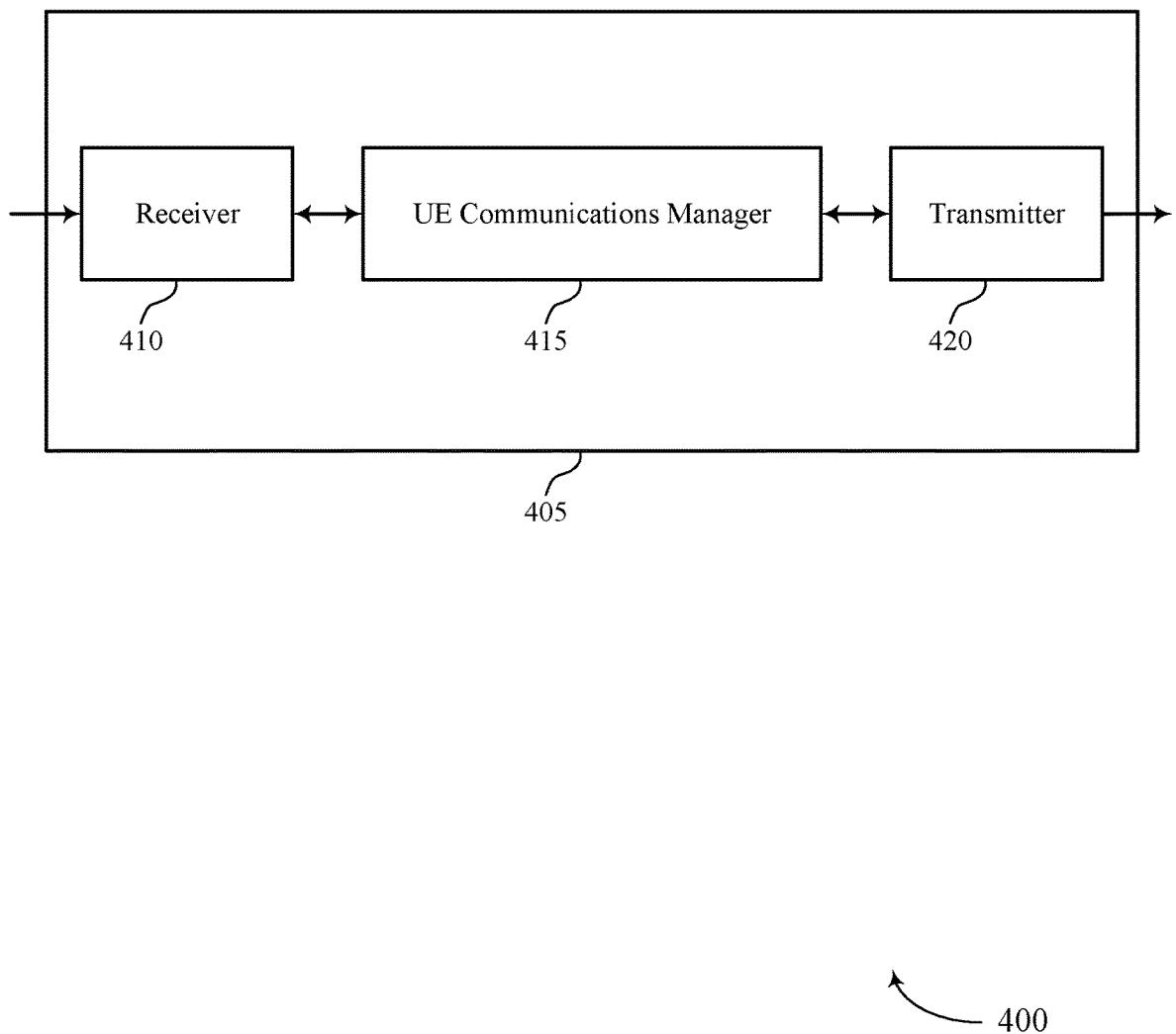
FIGS. 4 and 5 show block diagrams of devices that support spatial QCL conflict handling in accordance with aspects of the present disclosure.

FIG. 4 shows a block diagram 400 of a device 405 that supports spatial QCL conflict handling in accordance with aspects of the present disclosure. The device 405 may be an example of aspects of a UE 115 as described herein. The device 405 may include a receiver 410, a UE communications manager 415, and a transmitter 420. The device 405 may additionally or alternatively include a processor. Each of these components may be in communication with one another (e.g., via one or more buses).

The receiver 410 may receive information such as packets, user data, or control information associated with various information channels (e.g., control channels, data channels, and information related to spatial QCL conflict handling, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may receive a configuration for CA communications on a set of cells. Additionally, the UE communications manager 415 may determine, from the configuration and based on a predetermined relationship rule, that signals transmitted on the set of cells are spatially quasi co-located. In some cases, the UE communications manager 415 may receive the signals transmitted on the set of cells based on the determination that the signals are spatially quasi co-located. The UE communications manager 415 may be an example of aspects of the UE communications manager 710 described herein.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
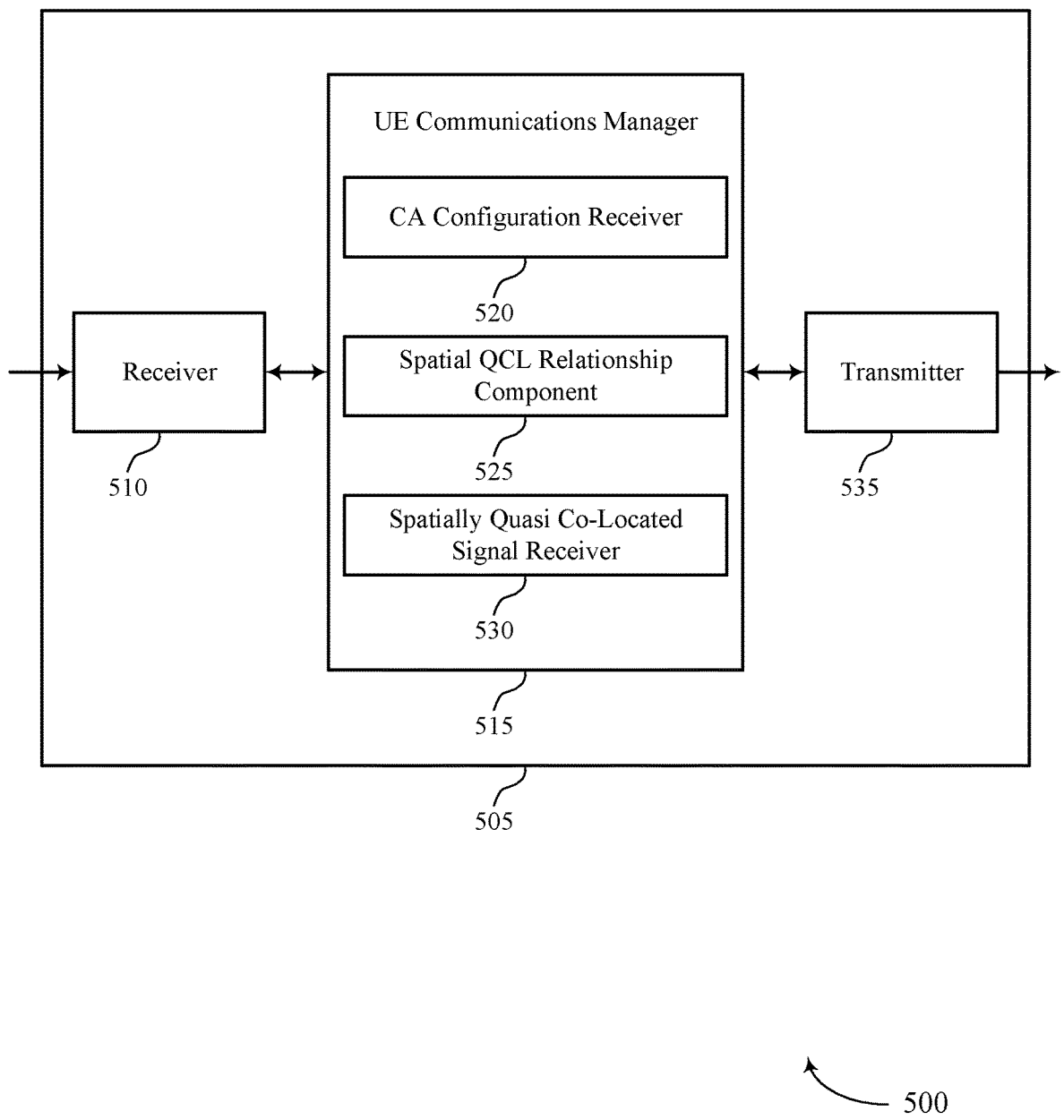

FIG. 5 shows a block diagram 500 of a device 505 that supports spatial QCL conflict handling in accordance with aspects of the present disclosure. The device 505 may be an example of aspects of a device 405, or a UE 115 as described herein. The device 505 may include a receiver 510, a UE communications manager 515, and a transmitter 535. The device 505 may additionally or alternatively include a processor. Each of these components may be in communication with one another (e.g., via one or more buses).

The receiver 510 may receive information such as packets, user data, or control information associated with various information channels (e.g., control channels, data channels, and information related to spatial QCL conflict handling, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a CA configuration receiver 520, a spatial QCL relationship component 525, and a spatially quasi co-located signal receiver 530. The UE communications manager 515 may be an example of aspects of the UE communications manager 710 described herein.

The CA configuration receiver 520 may receive a configuration for CA communications on a set of cells. The spatial QCL relationship component 525 may determine, from the configuration and based on a predetermined relationship rule, that signals transmitted on the set of cells are spatially quasi co-located. The spatially quasi co-located signal receiver 530 may receive the signals transmitted on the set of cells based on the determination that the signals are spatially quasi co-located.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
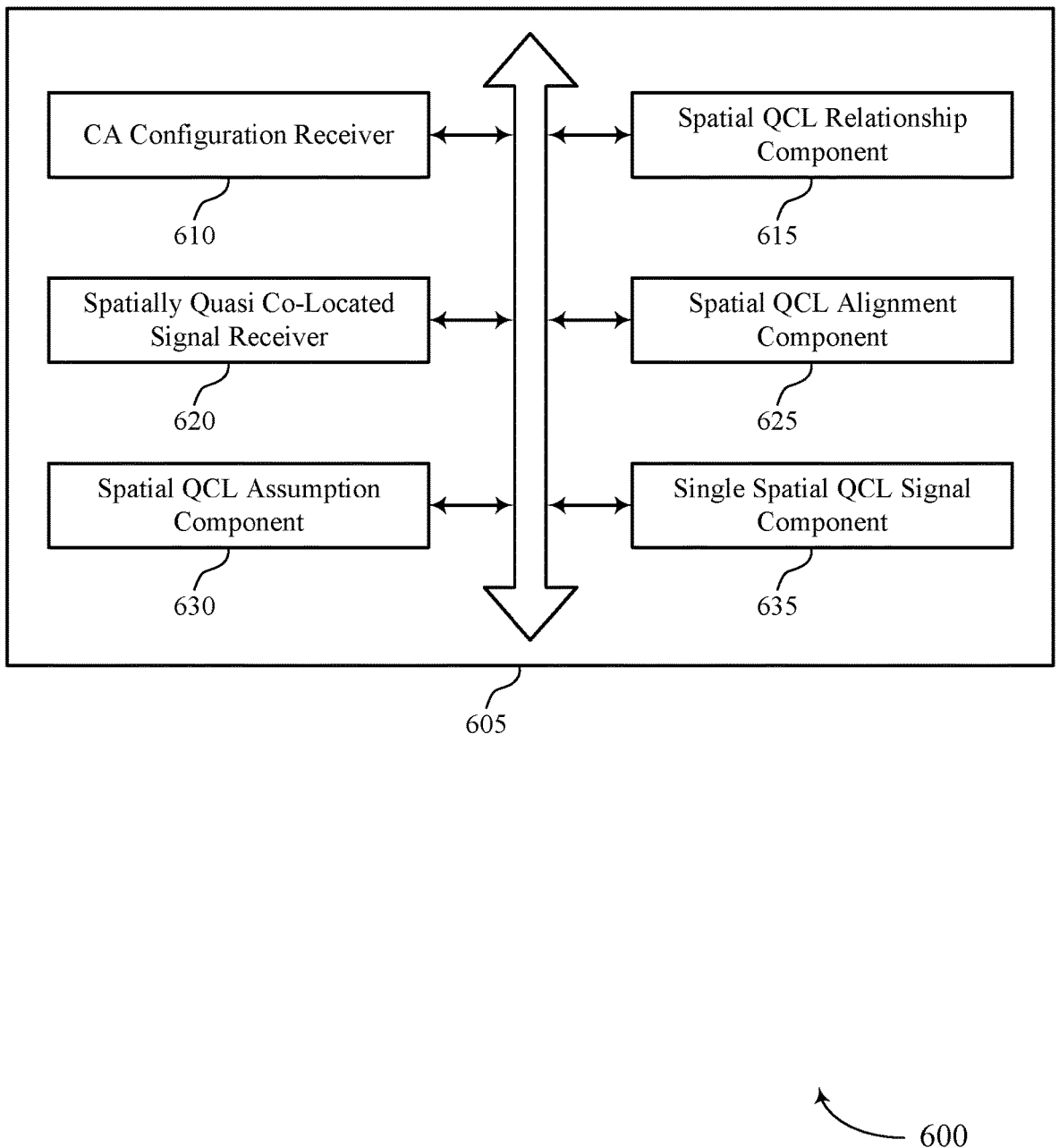
FIG. 6 shows a block diagram of a user equipment (UE) communications manager that supports spatial QCL conflict handling in accordance with aspects of the present disclosure.

FIG. 6 shows a block diagram 600 of a UE communications manager 605 that supports spatial QCL conflict handling in accordance with aspects of the present disclosure. The UE communications manager 605 may be an example of aspects of a UE communications manager 415, a UE communications manager 515, or a UE communications manager 710 described herein. The UE communications manager 605 may include a CA configuration receiver 610, a spatial QCL relationship component 615, a spatially quasi co-located signal receiver 620, a spatial QCL alignment component 625, a spatial QCL assumption component 630, and a single spatial QCL signal component 635. Each of these modules may communicate, directly or indirectly, with one another (e.g., via one or more buses). The CA configuration receiver 610 may receive a configuration for CA communications on a set of cells. In some cases, the CA configuration may be an intra-band CA configuration.

The spatial QCL relationship component 615 may determine, from the configuration and based on a predetermined relationship rule, that signals transmitted on the set of cells are spatially quasi co-located. In some examples, the spatial QCL relationship component 615 may receive a synchronization signal block and a reference signal sourced by the synchronization signal block, where the predetermined relationship rule is that synchronization signal blocks and reference signals sourced by the synchronization signal blocks are spatially quasi co-located even when the synchronization signal block and reference signals sourced by the synchronization signal block are not actually quasi co-located.

The spatially quasi co-located signal receiver 620 may receive the signals transmitted on the set of cells based on the determination that the signals are spatially quasi co-located. In some examples, the spatially quasi co-located signal receiver 620 may monitor for one or more synchronization signal blocks from a first cell of the set of cells based on the predetermined relationship rule. Additionally, the spatially quasi co-located signal receiver 620 may receive at least one synchronization signal black based on monitoring for the one or more synchronization signal blocks. The spatially quasi co-located signal receiver 620 may additionally or alternatively receive one or more reference signals from at least one cell of the set of cells based on the predetermined relationship rule and monitoring for the synchronization signal blocks. In some cases, the reference signals may include CSI-RSs, TRSs, or a combination thereof.

The spatial QCL alignment component 625 may receive multiple synchronization signal blocks from the set of cells. In some examples, the spatial QCL alignment component 625 may identify that the multiple synchronization signal blocks each have a same synchronization signal block index, where the predetermined relationship rule is that signals across the set of cells are spatially quasi co-located based on the signals having the same synchronization signal block index. Additionally, the spatial QCL alignment component 625 may receive a cross-carrier indication that indicates a common synchronization signal block, where the predetermined relationship rule is that signals across the set of cells are spatially quasi co-located based on the common synchronization signal block.

The spatial QCL assumption component 630 may receive a synchronization signal block and a reference signal sourced by the synchronization signal block, where the predetermined relationship rule is that synchronization signal blocks and reference signals sourced by the synchronization signal blocks are spatially quasi co-located. In some cases, the synchronization signal block may be common across the set of cells.

The single spatial QCL signal component 635 may receive at least one of the signals on a particular cell of the set of cells, where the predetermined relationship rule is that the signals are spatially quasi co-located with the at least one of the signals based on a characteristic of the particular cell. In some cases, the characteristic of the particular cell may be that the particular cell is a primary cell, a primary secondary cell, or a cell with a smallest serving index within an intra-band CA. Additionally or alternatively, the single spatial QCL signal component 635 may receive the signals during a period of time during which the signals are actually spatially quasi co-located. The single spatial QCL signal component 635 may then select a signal during the period of time, where the predetermined relationship rule is that the signals are spatially quasi co-located with the selected signal.

Figure 7:
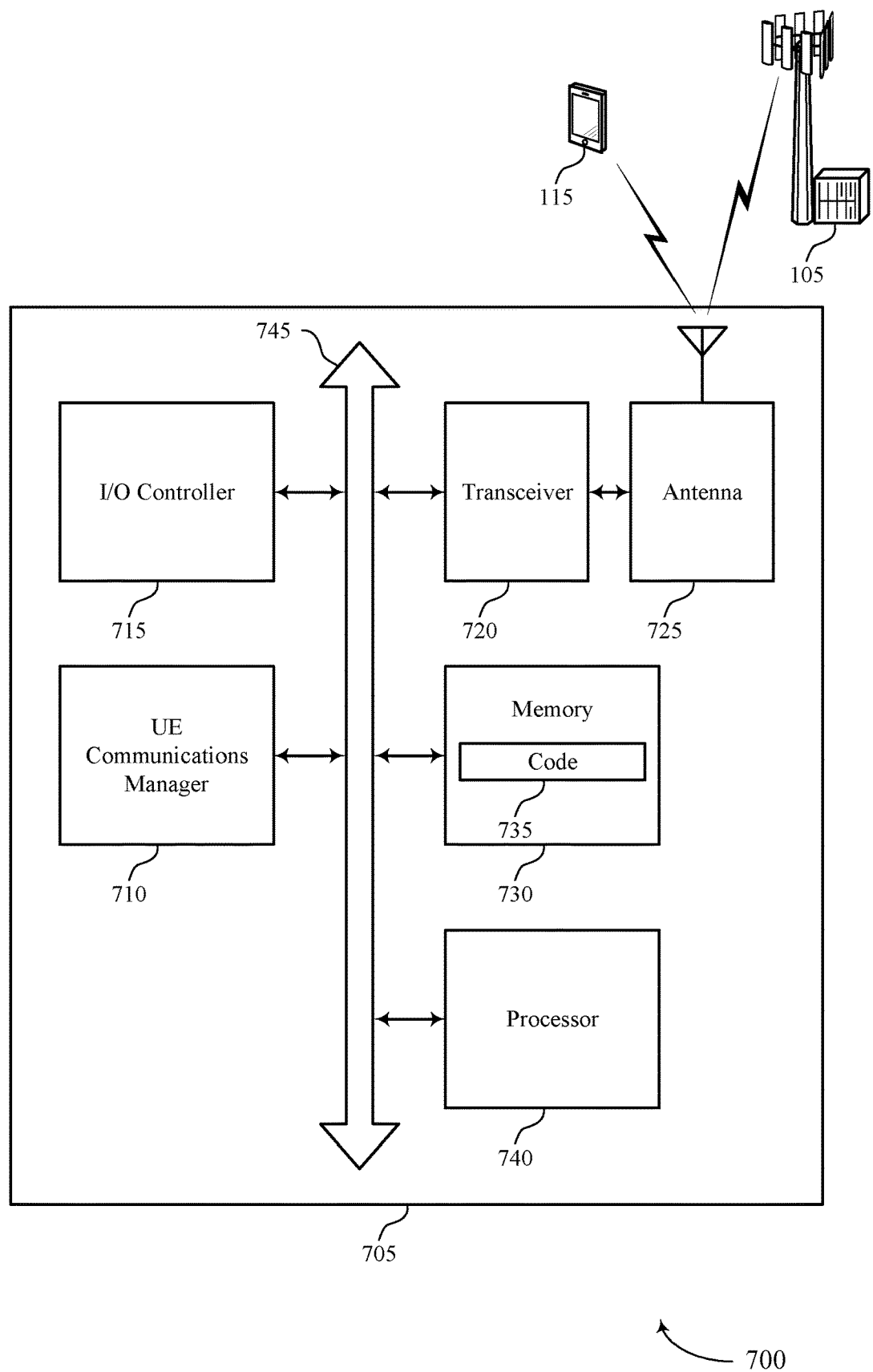
FIG. 7 shows a diagram of a system including a device that supports spatial QCL conflict handling in accordance with aspects of the present disclosure.

FIG. 7 shows a diagram of a system 700 including a device 705 that supports spatial QCL conflict handling in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may receive a configuration for CA communications on a set of cells. Additionally, the UE communications manager 710 may determine, from the configuration and based on a predetermined relationship rule, that signals transmitted on the set of cells are spatially quasi co-located. In some cases, the UE communications manager 710 may receive the signals transmitted on the set of cells based on the determination that the signals are spatially quasi co-located.

The I/O controller 715 may manage input and output signals for the device 705. The I/O controller 715 may additionally or alternatively manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may additionally or alternatively include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting spatial QCL conflict handling).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
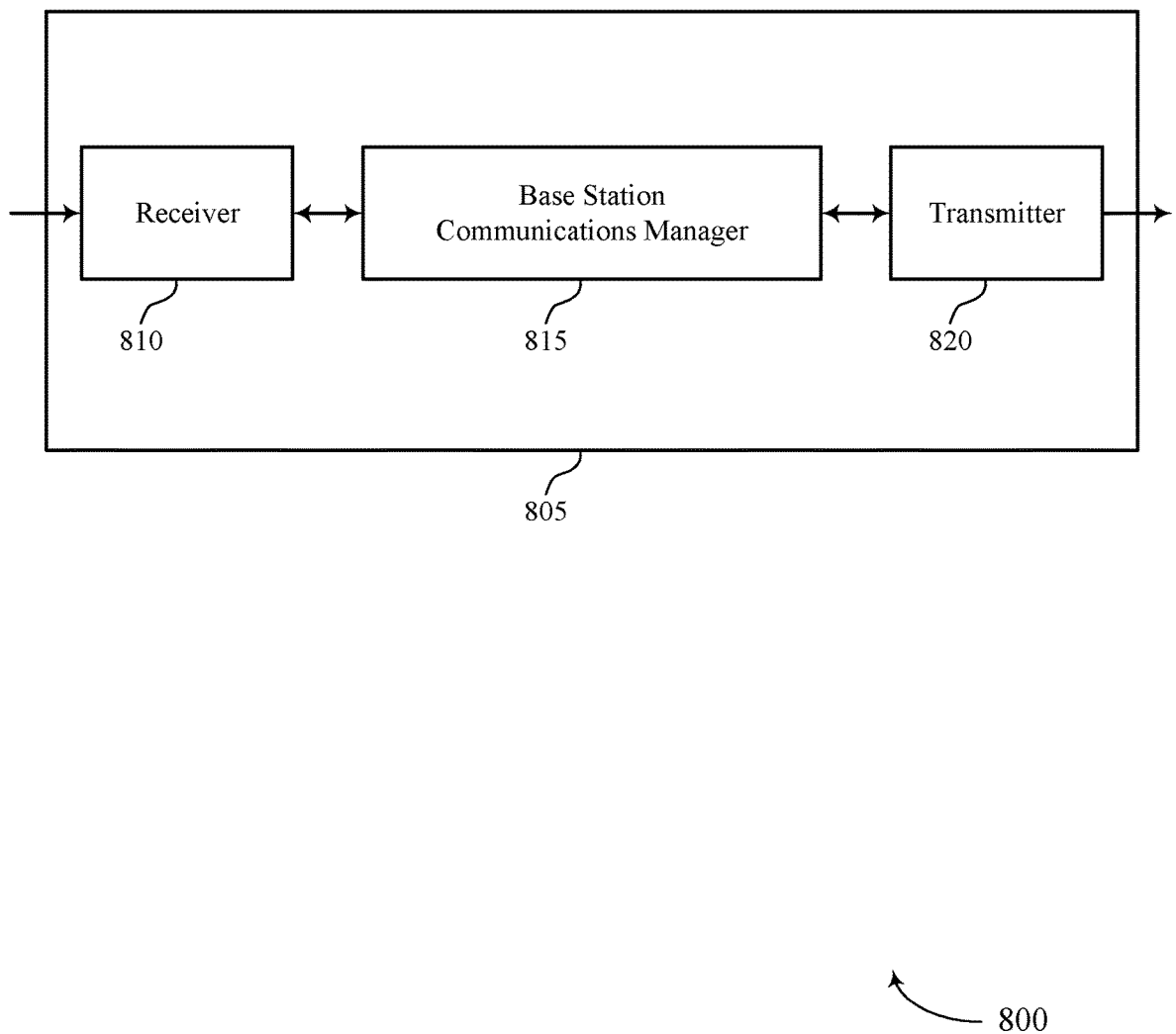
FIGS. 8 and 9 show block diagrams of devices that support spatial QCL conflict handling in accordance with aspects of the present disclosure.

FIG. 8 shows a block diagram 800 of a device 805 that supports spatial QCL conflict handling in accordance with aspects of the present disclosure. The device 805 may be an example of aspects of a base station 105 as described herein. The device 805 may include a receiver 810, a base station communications manager 815, and a transmitter 820. The device 805 may additionally or alternatively include a processor. Each of these components may be in communication with one another (e.g., via one or more buses).

The receiver 810 may receive information such as packets, user data, or control information associated with various information channels (e.g., control channels, data channels, and information related to spatial QCL conflict handling, etc.). Information may be passed on to other components of the device 805. The receiver 810 may be an example of aspects of the transceiver 1120 described with reference to FIG. 11. The receiver 810 may utilize a single antenna or a set of antennas. The base station communications manager 815 may transmit, to a UE, a CA configuration for communications on a set of cells. Additionally, the base station communications manager 815 may transmit signals to the UE in accordance with a predetermined relationship rule such that the UE can receive the signals as if the signals are spatially quasi co-located. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
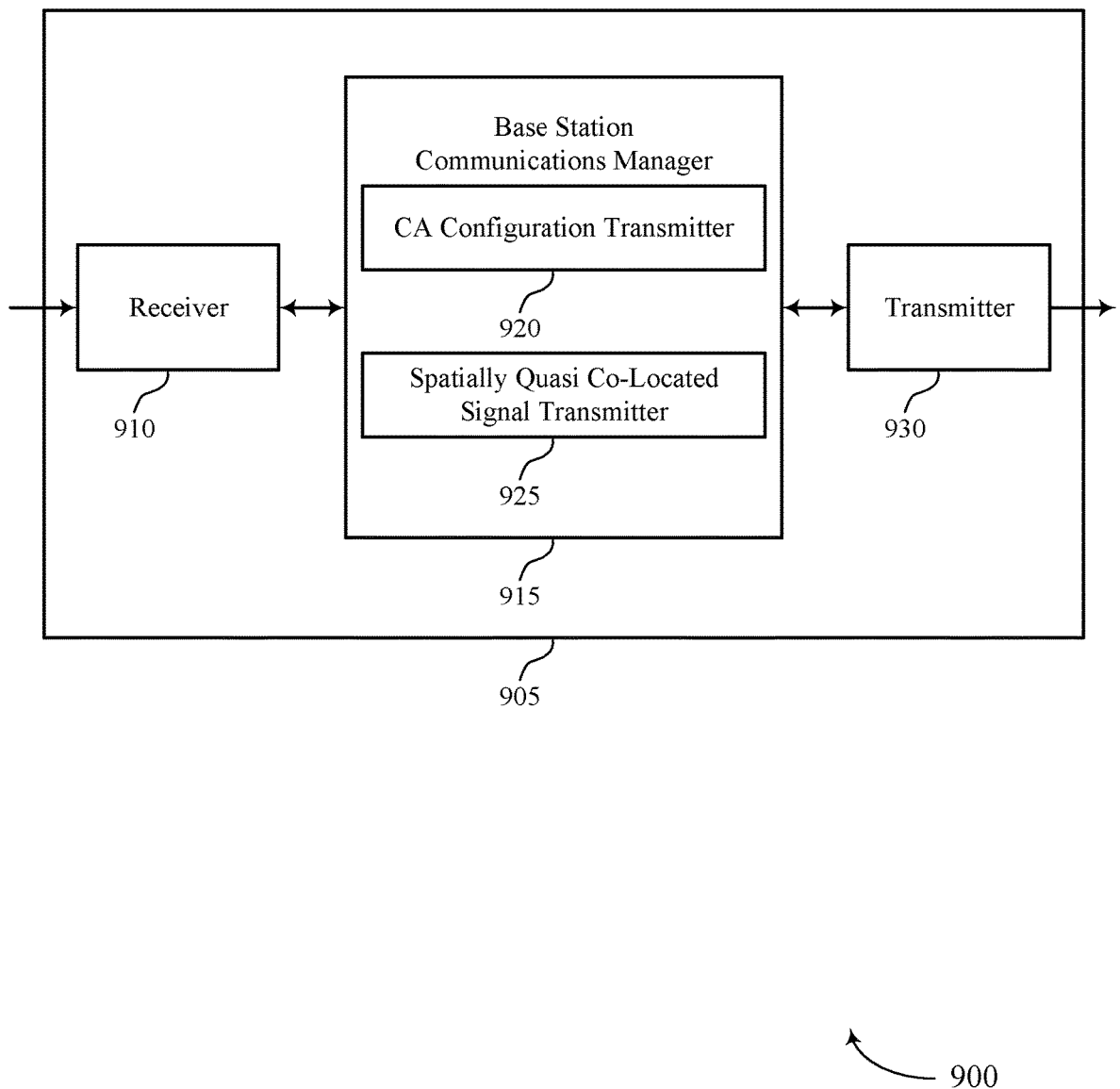

FIG. 9 shows a block diagram 900 of a device 905 that supports spatial QCL conflict handling in accordance with aspects of the present disclosure. The device 905 may be an example of aspects of a device 805, or a base station 105 as described herein. The device 905 may include a receiver 910, a base station communications manager 915, and a transmitter 930. The device 905 may additionally or alternatively include a processor. Each of these components may be in communication with one another (e.g., via one or more buses).

The receiver 910 may receive information such as packets, user data, or control information associated with various information channels (e.g., control channels, data channels, and information related to spatial QCL conflict handling, etc.). Information may be passed on to other components of the device 905. The receiver 910 may be an example of aspects of the transceiver 1120 described with reference to FIG. 11. The receiver 910 may utilize a single antenna or a set of antennas. The base station communications manager 915 may be an example of aspects of the base station communications manager 815 as described herein. The base station communications manager 915 may include a CA configuration transmitter 920 and a spatially quasi co-located signal transmitter 925. The base station communications manager 915 may be an example of aspects of the base station communications manager 1110 described herein.

The CA configuration transmitter 920 may transmit, to a UE, a CA configuration for communications on a set of cells. The spatially quasi co-located signal transmitter 925 may transmit signals to the UE in accordance with a predetermined relationship rule such that the UE can receive the signals as if the signals are spatially quasi co-located. The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
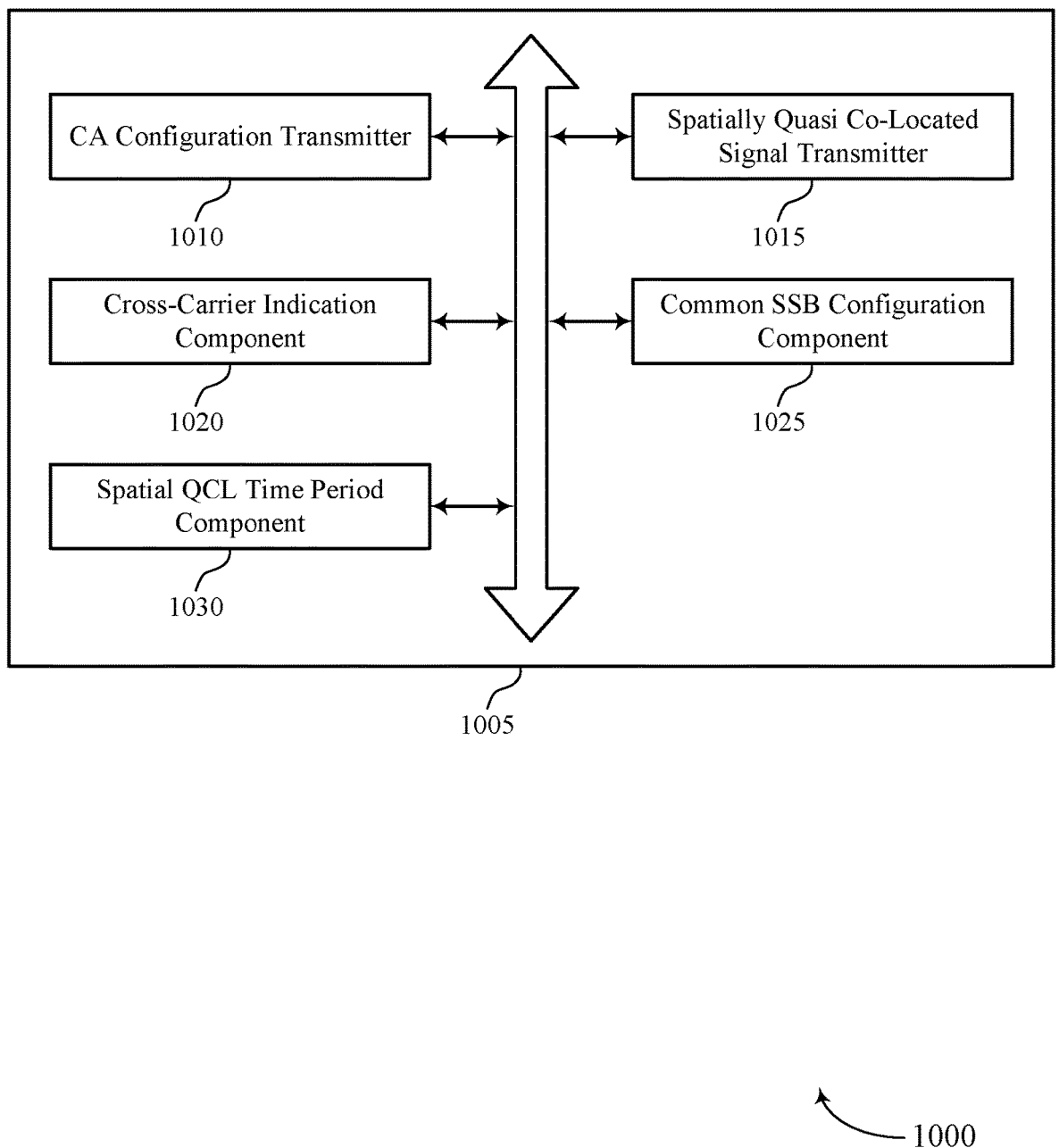
FIG. 10 shows a block diagram of a base station communications manager that supports spatial QCL conflict handling in accordance with aspects of the present disclosure.

FIG. 10 shows a block diagram 1000 of a base station communications manager 1005 that supports spatial QCL conflict handling in accordance with aspects of the present disclosure. The base station communications manager 1005 may be an example of aspects of a base station communications manager 815, a base station communications manager 915, or a base station communications manager 1110 described herein. The base station communications manager 1005 may include a CA configuration transmitter 1010, a spatially quasi co-located signal transmitter 1015, a cross-carrier indication component 1020, a common SSB configuration component 1025, and a spatial QCL time period component 1030. Each of these modules may communicate, directly or indirectly, with one another (e.g., via one or more buses).

The CA configuration transmitter 1010 may transmit, to a UE, a CA configuration for communications on a set of cells. In some cases, the CA configuration for communications on a set of cells may include an intra-band CA configuration. The spatially quasi co-located signal transmitter 1015 may transmit signals to the UE in accordance with a predetermined relationship rule such that the UE can receive the signals as if the signals are spatially quasi co-located. In some examples, the spatially quasi co-located signal transmitter 1015 may transmit one or more synchronization signal blocks having a first spatial QCL. Additionally, the spatially quasi co-located signal transmitter 1015 may transmit one or more reference signals sourced by the one or more synchronization signal blocks having a second spatial QCL. In some cases, the one or more synchronization signal blocks and the one or more reference signals sourced by the one or more synchronization signal blocks may not be spatially quasi co-located. Alternatively, the one or more synchronization signal blocks and the one or more reference signals sourced by the one or more synchronization signal blocks may not spatially quasi co-located.

The cross-carrier indication component 1020 may transmit a cross-carrier indication that the signals are spatially quasi co-located via a common synchronization signal block based on the intra-band CA configuration. The common SSB configuration component 1025 may configure the signals across cells within the CA such that the signals are spatially quasi co-located with a common synchronization signal block. The spatial QCL time period component 1030 may transmit the signals during a period of time during which the signals are actually spatially quasi co-located for a period of time.

Figure 11:
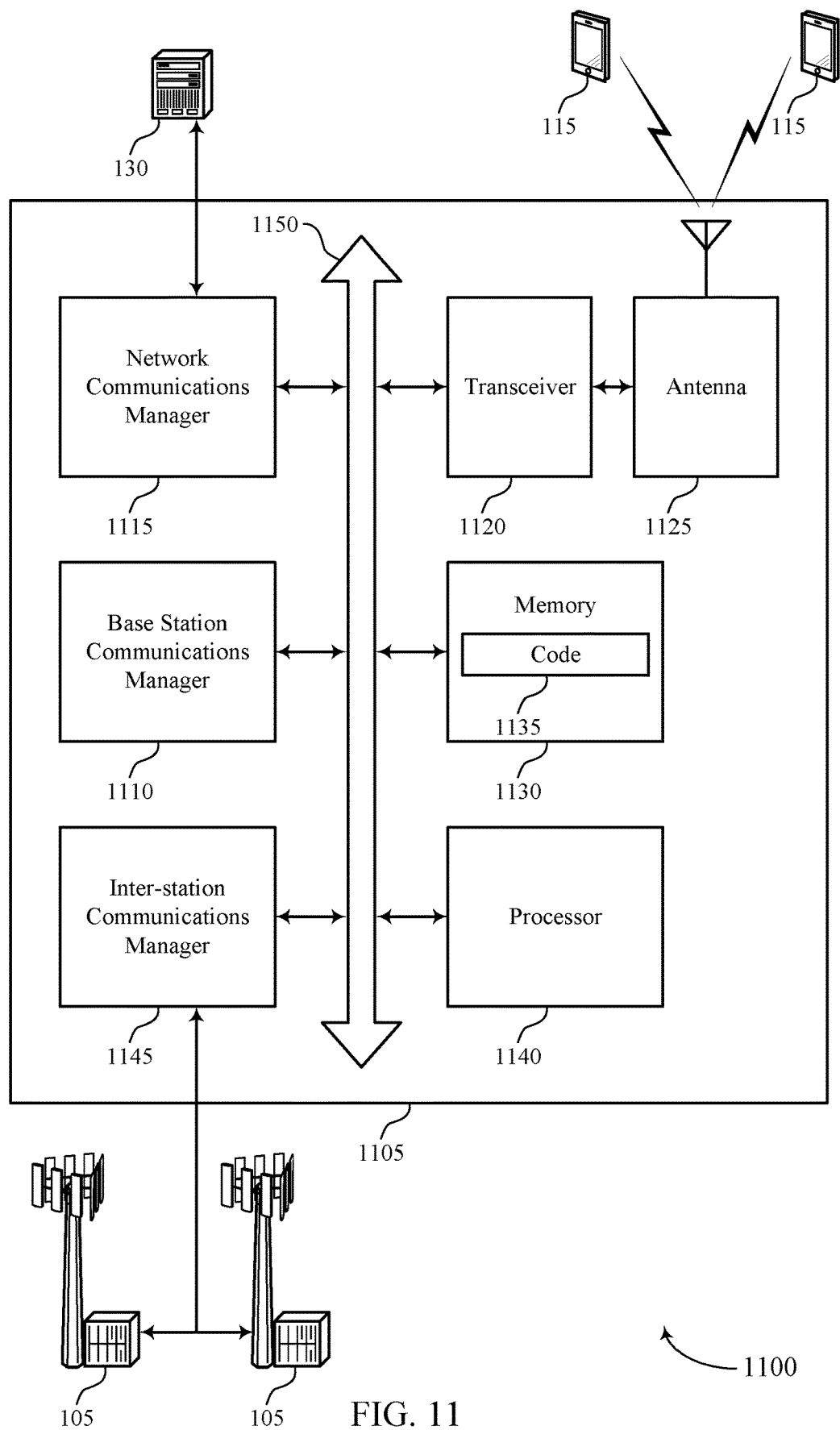
FIG. 11 shows a diagram of a system including a device that supports spatial QCL conflict handling in accordance with aspects of the present disclosure.

FIG. 11 shows a diagram of a system 1100 including a device 1105 that supports spatial QCL conflict handling in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may transmit, to a UE, a CA configuration for communications on a set of cells. Additionally, the base station communications manager 1110 may transmit signals to the UE in accordance with a predetermined relationship rule such that the UE can receive the signals as if the signals are spatially quasi co-located. The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may additionally or alternatively include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions. The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting spatial QCL conflict handling).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
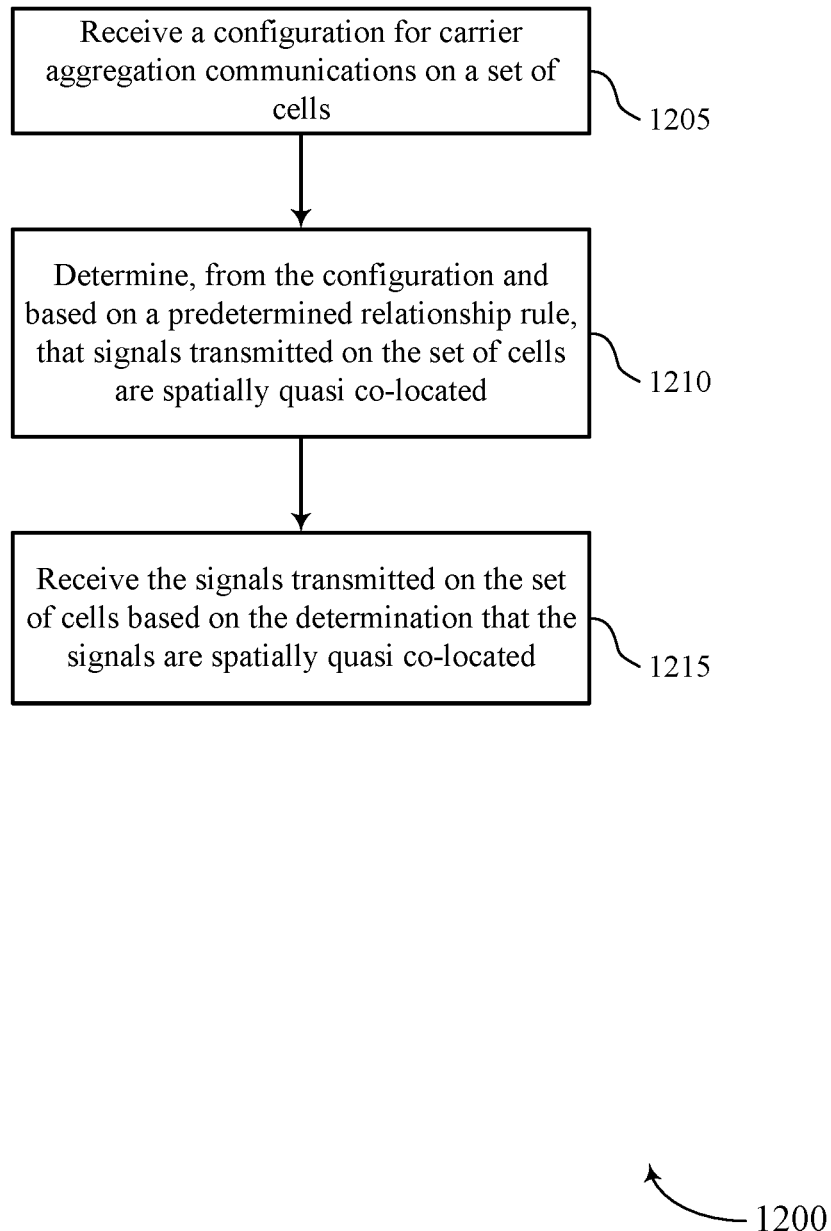
FIGS. 12 through 15 show flowcharts illustrating methods that support spatial QCL conflict handling in accordance with aspects of the present disclosure.

FIG. 12 shows a flowchart illustrating a method 1200 that supports spatial QCL conflict handling in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive a configuration for CA communications on a set of cells. The operations of 1205 may be performed according to the methods described herein. In some examples, aspects of the operations of 1205 may be performed by a CA configuration receiver as described with reference to FIGS. 4 through 7. At 1210, the UE may determine, from the configuration and based on a predetermined relationship rule, that signals transmitted on the set of cells are spatially quasi co-located. The operations of 1210 may be performed according to the methods described herein. In some examples, aspects of the operations of 1210 may be performed by a spatial QCL relationship component as described with reference to FIGS. 4 through 7.

At 1215, the UE may receive the signals transmitted on the set of cells based on the determination that the signals are spatially quasi co-located. The operations of 1215 may be performed according to the methods described herein. In some examples, aspects of the operations of 1215 may be performed by a spatially quasi co-located signal receiver as described with reference to FIGS. 4 through 7.

Figure 13:
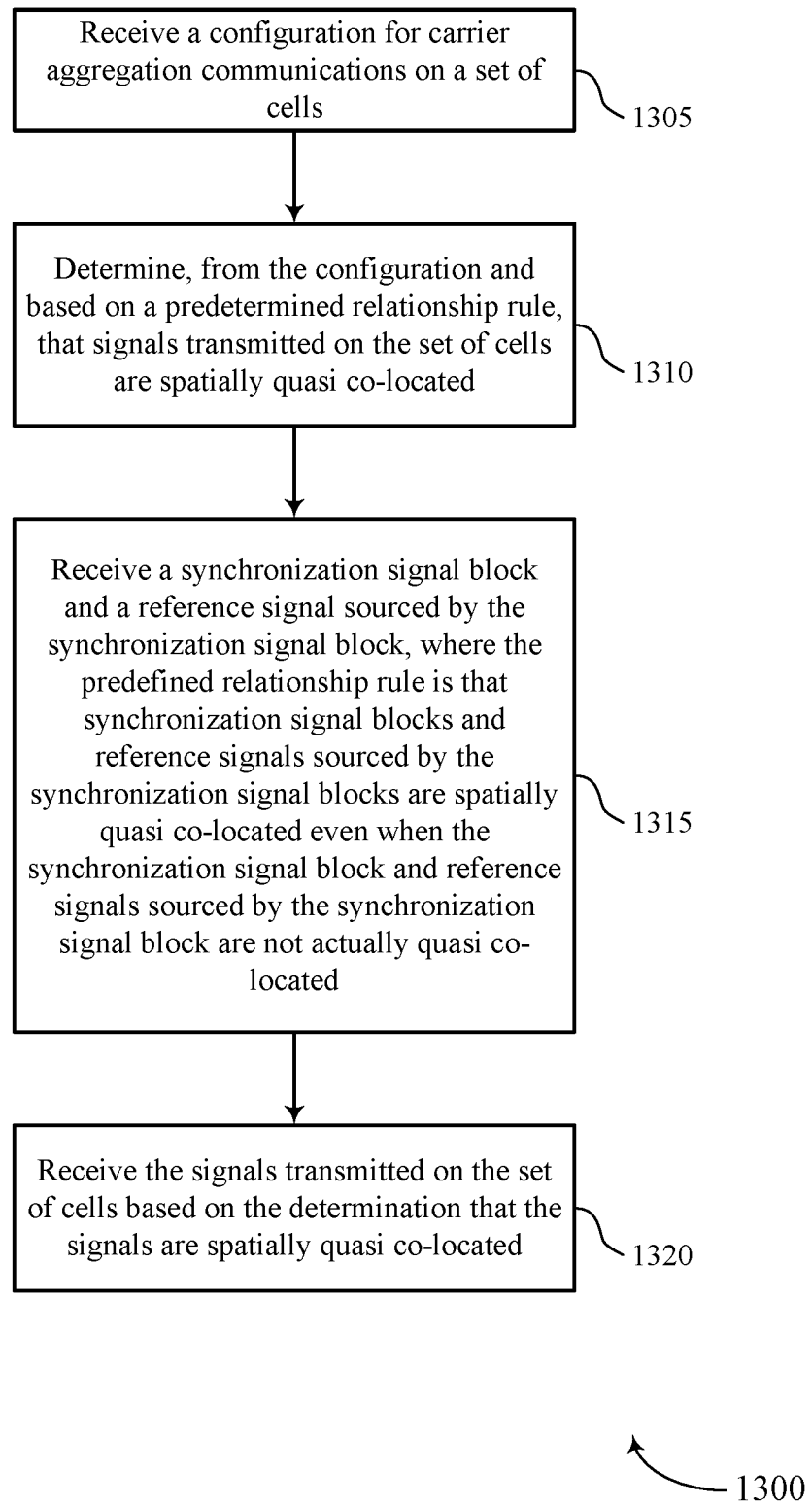

FIG. 13 shows a flowchart illustrating a method 1300 that supports spatial QCL conflict handling in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive a configuration for CA communications on a set of cells. The operations of 1305 may be performed according to the methods described herein. In some examples, aspects of the operations of 1305 may be performed by a CA configuration receiver as described with reference to FIGS. 4 through 7. At 1310, the UE may determine, from the configuration and based on a predetermined relationship rule, that signals transmitted on the set of cells are spatially quasi co-located. The operations of 1310 may be performed according to the methods described herein. In some examples, aspects of the operations of 1310 may be performed by a spatial QCL relationship component as described with reference to FIGS. 4 through 7.

At 1315, the UE may receive a synchronization signal block and a reference signal sourced by the synchronization signal block, where the predetermined relationship rule is that synchronization signal blocks and reference signals sourced by the synchronization signal blocks are spatially quasi co-located even when the synchronization signal block and reference signals sourced by the synchronization signal block are not actually quasi co-located. The operations of 1315 may be performed according to the methods described herein. In some examples, aspects of the operations of 1315 may be performed by a spatial QCL relationship component as described with reference to FIGS. 4 through 7. At 1320, the UE may receive the signals transmitted on the set of cells based on the determination that the signals are spatially quasi co-located. The operations of 1320 may be performed according to the methods described herein. In some examples, aspects of the operations of 1320 may be performed by a spatially quasi co-located signal receiver as described with reference to FIGS. 4 through 7.

Figure 14:
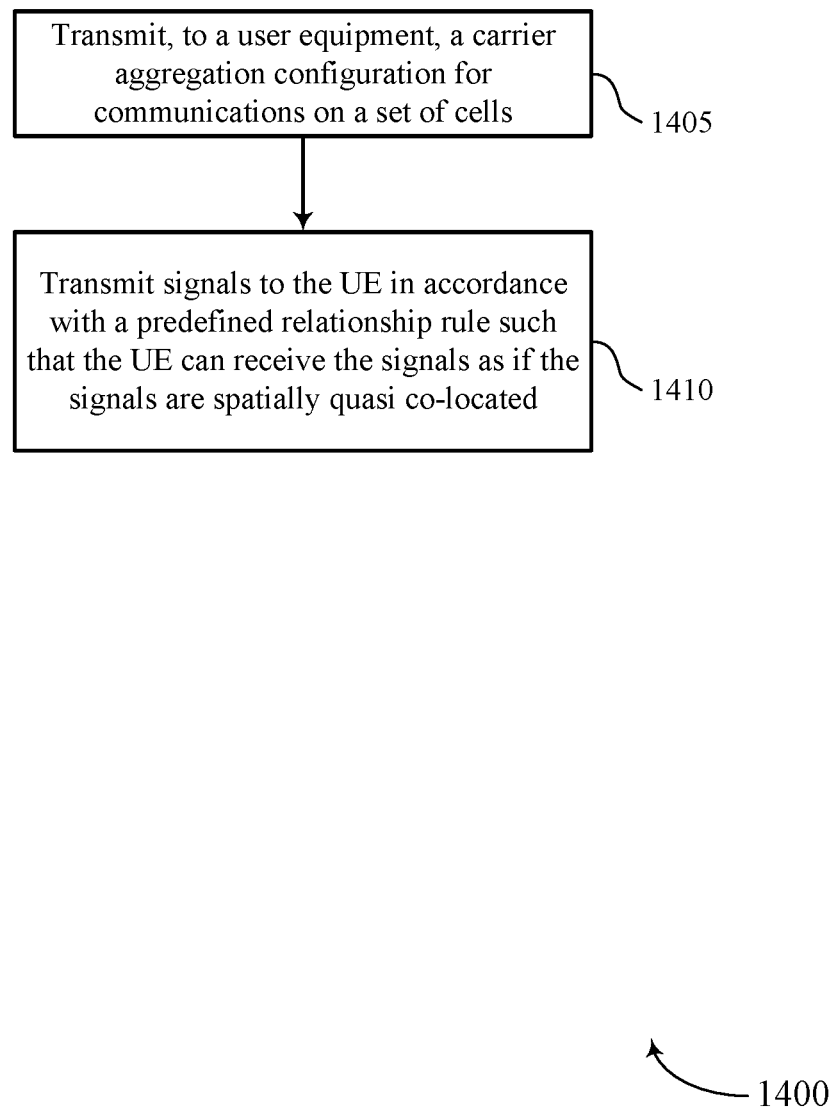

FIG. 14 shows a flowchart illustrating a method 1400 that supports spatial QCL conflict handling in accordance with aspects of the present disclosure. The operations of method 1400 may be implemented by a base station 105 or its components as described herein. For example, the operations of method 1400 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may transmit, to a UE, a CA configuration for communications on a set of cells. The operations of 1405 may be performed according to the methods described herein. In some examples, aspects of the operations of 1405 may be performed by a CA configuration transmitter as described with reference to FIGS. 8 through 11. At 1410, the base station may transmit signals to the UE in accordance with a predetermined relationship rule such that the UE can receive the signals as if the signals are spatially quasi co-located. The operations of 1410 may be performed according to the methods described herein. In some examples, aspects of the operations of 1410 may be performed by a spatially quasi co-located signal transmitter as described with reference to FIGS. 8 through 11.

Figure 15:
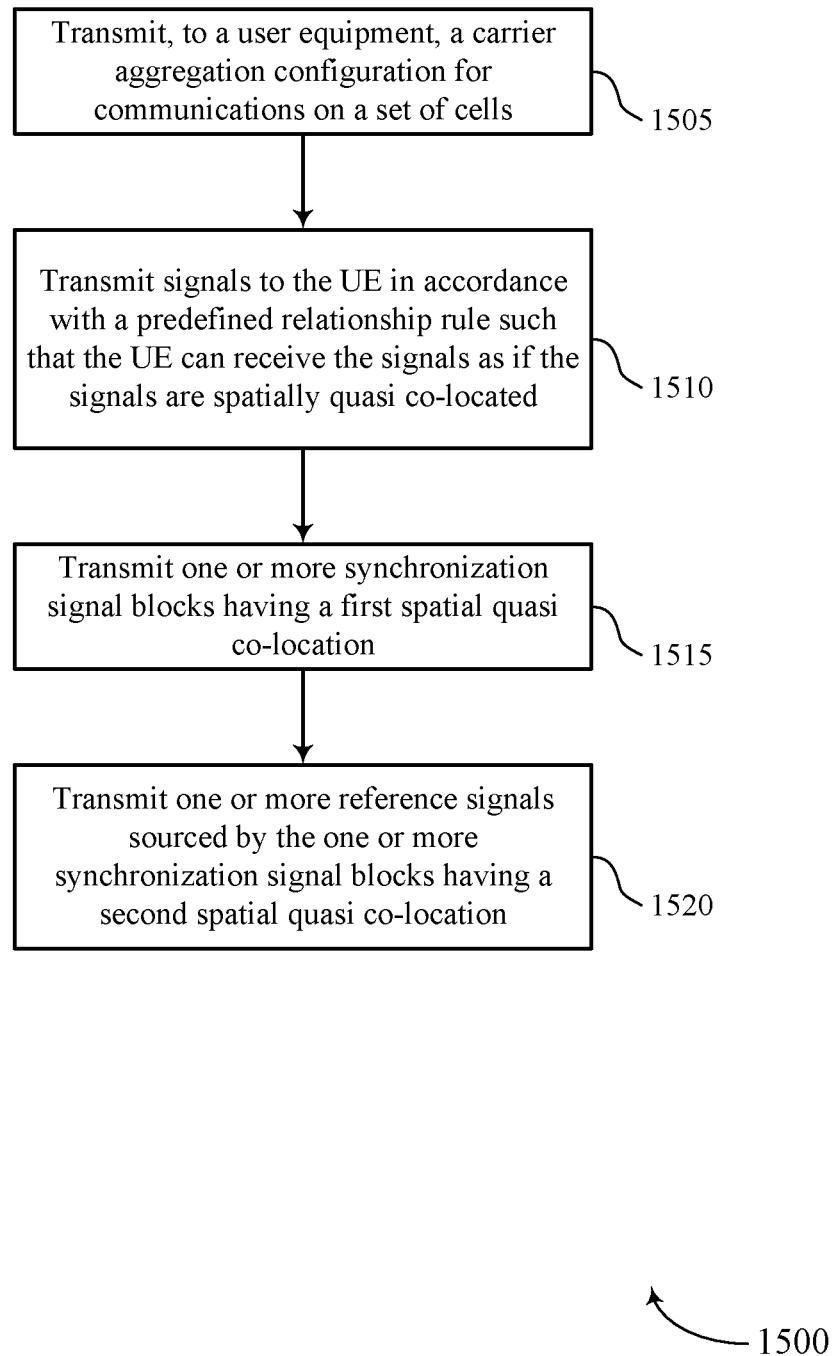

FIG. 15 shows a flowchart illustrating a method 1500 that supports spatial QCL conflict handling in accordance with aspects of the present disclosure. The operations of method 1500 may be implemented by a base station 105 or its components as described herein. For example, the operations of method 1500 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may transmit, to a UE, a CA configuration for communications on a set of cells. The operations of 1505 may be performed according to the methods described herein. In some examples, aspects of the operations of 1505 may be performed by a CA configuration transmitter as described with reference to FIGS. 8 through 11. At 1510, the base station may transmit signals to the UE in accordance with a predetermined relationship rule such that the UE can receive the signals as if the signals are spatially quasi co-located. The operations of 1510 may be performed according to the methods described herein. In some examples, aspects of the operations of 1510 may be performed by a spatially quasi co-located signal transmitter as described with reference to FIGS. 8 through 11.

At 1515, the base station may transmit one or more synchronization signal blocks having a first spatial QCL. The operations of 1515 may be performed according to the methods described herein. In some examples, aspects of the operations of 1515 may be performed by a spatially quasi co-located signal transmitter as described with reference to FIGS. 8 through 11. At 1520, the base station may transmit one or more reference signals sourced by the one or more synchronization signal blocks having a second spatial QCL. The operations of 1520 may be performed according to the methods described herein. In some examples, aspects of the operations of 1520 may be performed by a spatially quasi co-located signal transmitter as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, universal terrestrial radio access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a configuration for carrier aggregation communications comprising an indication of intra-band carrier aggregation on a plurality of cells;
    determining, from the indication and a predetermined relationship rule for assuming that signals across the plurality of cells are spatially quasi co-located based at least in part on the signals being associated with a common synchronization signal block, that a first reference signal sourced by a first synchronization signal block from a first cell of the plurality of cells and a second reference signal from a second cell of the plurality of cells are spatially quasi co-located, wherein the first synchronization signal block is common across the plurality of cells; and
    receiving the first and second reference signals from the plurality of cells based at least in part on the determining that the first and second reference signals are spatially quasi co-located.

2. The method of claim 1, further comprising:
    identifying that the first synchronization signal block and one or more other synchronization signal blocks each have a same synchronization signal block index, wherein the predetermined relationship rule comprises that signals across the plurality of cells are spatially quasi co-located based on the signals having the same synchronization signal block index.

3. The method of claim 1, further comprising:
    receiving a cross-carrier indication that indicates that the first synchronization signal block is the common synchronization signal block across the plurality of cells.

4. The method of claim 1, wherein the predetermined relationship rule comprises that signals are spatially quasi co-located with at least one signal from a particular cell of the plurality of cells based on a characteristic of the particular cell.

5. The method of claim 4, wherein the characteristic of the particular cell is that the particular cell is a primary cell, a primary secondary cell, or a cell with a smallest serving index within the intra-band carrier aggregation.

6. The method of claim 1, further comprising:
    receiving the first and second reference signals during a period of time during which the first and second reference signals are actually spatially quasi co-located; and
    selecting at least one of the first or second reference signal during the period of time, wherein the predetermined relationship rule is that signals are spatially quasi co-located with the selected at least one of the first or second reference signal.

7. The method of claim 1, further comprising:
monitoring for one or more synchronization signal blocks from the first cell of the plurality of cells based at least in part on the predetermined relationship rule; and
wherein the receiving the first and second reference signals from the plurality of cells comprises:
receiving the first synchronization signal block based at least in part on monitoring for the one or more synchronization signal blocks; and
receiving the second reference signal from the second cell of the plurality of cells based at least in part on the predetermined relationship rule and the monitoring for the one or more synchronization signal blocks.

8. The method of claim 1, wherein the first and second reference signals comprise channel state information reference signals, a tracking reference signals, or a combination thereof.

9. The method of claim 1, wherein the predetermined relationship rule comprises that synchronization signal blocks and reference signals sourced by the synchronization signal blocks are spatially quasi co-located even when the synchronization signal blocks and the reference signals sourced by the synchronization signal blocks are not actually quasi co-located.

10. A method for wireless communications at a base station, comprising:
transmitting, to a user equipment (UE), a carrier aggregation configuration for communications comprising an indication of intra-band carrier aggregation on a plurality of cells; and
transmitting a first reference signal sourced by a first synchronization signal block from a first cell of the plurality of cells and a second reference signal from a second cell of the plurality of cells to the UE in accordance with a predetermined relationship rule for assuming that signals across the plurality of cells are spatially quasi co-located based at least in part on the signals being associated with a common synchronization signal block and the indication of the intra-band carrier aggregation on the plurality of cells such that the UE can receive the first and second reference signals as if the signals are spatially quasi co-located, wherein the first synchronization signal block is common across the plurality of cells.

11. The method of claim 10, wherein the carrier aggregation configuration for communications on the plurality of cells comprises an intra-band carrier aggregation configuration.

12. The method of claim 10, further comprising:
configuring signals across cells within the carrier aggregation configuration such that the signals are spatially quasi co-located with a common synchronization signal block across the plurality of cells, wherein the first synchronization signal block is the common synchronization signal block.

13. The method of claim 10, further comprising:
transmitting the first and second reference signals during a period of time during which the first and second reference signals are actually spatially quasi co-located.

14. An apparatus for wireless communications at a user equipment (UE), comprising:
a processor, memory in electronic communication with the processor; and
instructions stored in the memory and executable by the processor to cause the apparatus to:
receive a configuration for carrier aggregation communications comprising an indication of intra-band carrier aggregation on a plurality of cells;
determine, from the indication and a predetermined relationship rule for assuming that signals across the plurality of cells are spatially quasi co-located based at least in part on the signals being associated with a common synchronization signal block, that a first reference signal sourced by a first synchronization signal block from a first cell of the plurality of cells and a second reference signal from a second cell of the plurality of cells are spatially quasi co-located, wherein the first synchronization signal block is common across the plurality of cells; and
receive the first and second reference signals from the plurality of cells based at least in part on a determination that the first and second reference signals are spatially quasi co-located.

15. The apparatus of claim 14, wherein the instructions are further executable by the processor to cause the apparatus to:
identify that the first synchronization signal block and one or more other synchronization signal blocks each have a same synchronization signal block index, wherein the predetermined relationship rule is that signals across the plurality of cells are spatially quasi co-located based on the signals having the same synchronization signal block index.

16. The apparatus of claim 14, wherein the instructions are further executable by the processor to cause the apparatus to:
receive a cross-carrier indication that indicates the first synchronization signal block is the common synchronization signal block across the plurality of cells.

17. The apparatus of claim 14, wherein the predetermined relationship rule is that signals are spatially quasi co-located with at least one signal from a particular cell of the plurality of cells based on a characteristic of the particular cell.

18. The apparatus of claim 17, wherein the characteristic of the particular cell is that the particular cell is a primary cell, a primary secondary cell, or a cell with a smallest serving index within the intra-band carrier aggregation.

19. The apparatus of claim 14, wherein the instructions are further executable by the processor to cause the apparatus to:
receive the first and second reference signals during a period of time during which the first and second reference signals are actually spatially quasi co-located; and
select at least one of the first or second reference signal during the period of time, wherein the predetermined relationship rule is that signals are spatially quasi co-located with the selected at least one of the first or second signal.

20. The apparatus of claim 14, wherein the instructions are further executable by the processor to cause the apparatus to:
monitor for one or more synchronization signal blocks from the first cell of the plurality of cells based at least in part on the predetermined relationship rule; and
wherein the instructions to receive the first and second reference signals from the plurality of cells are executable by the processor to cause the apparatus to:

receive the first synchronization signal block based at least in part on monitoring for the one or more synchronization signal blocks; and receive the second reference signal from the second cell of the plurality of cells based at least in part on the predetermined relationship rule and monitoring for the one or more synchronization signal blocks.

21. The apparatus of claim 14, wherein the first and second reference signals comprise channel state information reference signals, a tracking reference signals, or a combination thereof.

22. The apparatus of claim 14, wherein the predetermined relationship rule is that synchronization signal blocks and reference signals sourced by the synchronization signal blocks are spatially quasi co-located even when the synchronization signal blocks and the reference signals sourced by the synchronization signal blocks are not actually quasi co-located.

23. An apparatus for wireless communications at a base station, comprising:

a processor, memory in electronic communication with the processor; and instructions stored in the memory and executable by the processor to cause the apparatus to:

transmit, to a user equipment (UE), a carrier aggregation configuration for communications comprising an indication of intra-band carrier aggregation on a plurality of cells; and transmit a first reference signal sourced by a first synchronization signal block from a first cell of the plurality of cells and a second reference signal from a second cell of the plurality of cells to the UE in accordance with a predetermined relationship rule for assuming that signals across the plurality of cells are spatially quasi co-located based at least in part on the signals being associated with a common synchronization signal block and the indication of the intra-band carrier aggregation on the plurality of cells such that the UE can receive the first and second reference signals as if the signals are spatially quasi co-located, wherein the first synchronization signal block is common across the plurality of cells.

24. The apparatus of claim 23, wherein the carrier aggregation configuration for communications on the plurality of cells comprises an intra-band carrier aggregation configuration.

25. The apparatus of claim 23, wherein the instructions stored in the memory and executable by the processor further cause the apparatus to:

configure signals across cells within the carrier aggregation configuration such that the signals are spatially quasi co-located with a common synchronization signal block across the plurality of cells, wherein the first synchronization signal block is the common synchronization signal block.

26. The apparatus of claim 23, wherein the instructions stored in the memory and executable by the processor further cause the apparatus to:

transmit the first and second reference signals during a period of time during which the first and second reference signals are actually spatially quasi co-located.

* * * * *